US010186111B2

(12) United States Patent
Antkowiak et al.

(10) Patent No.: US 10,186,111 B2
(45) Date of Patent: *Jan. 22, 2019

(54) CONTROLLING WAGERING GAME SYSTEM BROWSER AREAS

(71) Applicant: Bally Gaming, Inc., Las Vegas, NV (US)

(72) Inventors: Ryan D. Antkowiak, Chicago, IL (US); Jesse L. Garvey, Chicago, IL (US); Daniel J. Gazdic, Chicago, IL (US); Damon E. Gura, Chicago, IL (US); Budyanto Himawan, Palatine, IL (US); Audrey F. Y. Ho, Chicago, IL (US); Robertus A. I. Kloes, London (GB); Jeffrey M. Leverenz, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,080

(22) Filed: Jun. 5, 2017

(65) Prior Publication Data
US 2017/0270748 A1 Sep. 21, 2017

Related U.S. Application Data

(63) Continuation of application No. 15/133,031, filed on Apr. 19, 2016, now Pat. No. 9,672,691, which is a (Continued)

(51) Int. Cl.
A63F 13/00 (2014.01)
G07F 17/32 (2006.01)
A63F 13/573 (2014.01)

(52) U.S. Cl.
CPC ........ *G07F 17/3225* (2013.01); *A63F 13/573* (2014.09); *G07F 17/3209* (2013.01); *G07F 17/3211* (2013.01); *G07F 17/3244* (2013.01)

(58) Field of Classification Search
CPC .......... A63F 13/40; A63F 13/50; A63F 13/55; A63F 13/57; A63F 13/573; G07F 17/32; G07F 17/3209; G07F 17/3211
(Continued)

(56) References Cited

U.S. PATENT DOCUMENTS 5,129,652 A 7/1992 Wilkinson et al.
5,401,018 A 3/1995 Kelly et al.
(Continued)

FOREIGN PATENT DOCUMENTS

EP 1799318 3/2006
JP 2005185425 7/2005
(Continued)

OTHER PUBLICATIONS

"Reel Deal Live", Phantom EFX, 2010, 3 pages.
(Continued)

*Primary Examiner* — Michael Cuff
(74) *Attorney, Agent, or Firm* — Marvin A. Hein

(57) ABSTRACT

Wagering game systems, methods and associated operations are described herein. The operations can include presenting one or more browsers on display device. A browser area can be presented in at least a portion of at least one browser. An ownership of the browser area can be determined. The browser area can be customized in accordance with the ownership of the browser area.

19 Claims, 10 Drawing Sheets

Related U.S. Application Data continuation of application No. 13/204,269, filed on Aug. 5, 2011, now Pat. No. 9,345,973.

(60) Provisional application No. 61/371,283, filed on Aug. 6, 2010.

(58) Field of Classification Search
USPC .............................................. 463/42, 29, 13
See application file for complete search history.

(56) References Cited

U.S. PATENT DOCUMENTS

| | | |
|---|---|---|
| 5,618,232 A | 4/1997 | Martin |
| 5,890,962 A | 4/1999 | Takemoto |
| 5,941,772 A | 8/1999 | Paige et al. |
| 6,001,016 A | 12/1999 | Walker et al. |
| 6,129,632 A | 10/2000 | Luciano |
| 6,270,410 B1 | 8/2001 | DeMar et al. |
| 6,311,976 B1 | 11/2001 | Yoseloff |
| 6,375,567 B1 | 4/2002 | Acres |
| 6,409,602 B1 | 6/2002 | Wiltshire et al. |
| 6,443,837 B1 | 9/2002 | Jaffe et al. |
| 6,476,830 B1 | 11/2002 | Farmer et al. |
| 6,508,709 B1 | 1/2003 | Karmarkar |
| 6,592,460 B2 | 7/2003 | Laerence |
| 6,606,659 B1 | 8/2003 | Hegli et al. |
| 6,790,142 B2 | 9/2004 | Okada et al. |
| 6,860,810 B2 | 3/2005 | Cannon et al. |
| 6,863,608 B1 | 3/2005 | LeMay et al. |
| 6,887,157 B2 | 5/2005 | LeMay et al. |
| 6,913,532 B2 | 7/2005 | Baerlocher et al. |
| 7,090,576 B2 | 8/2006 | Herbrich et al. |
| 7,160,187 B2 | 1/2007 | Loose et al. |
| 7,472,910 B1 | 1/2009 | Okada et al. |
| 7,484,176 B2 | 1/2009 | Blattner et al. |
| 7,636,755 B2 | 12/2009 | Blattner et al. |
| 7,753,770 B2 | 7/2010 | Walker et al. |
| 7,867,083 B2 | 1/2011 | Wells et al. |
| 7,883,413 B2 | 2/2011 | Paulsen |
| 7,918,738 B2 | 4/2011 | Paulsen |
| 7,946,922 B2 | 5/2011 | Yin |
| 8,025,569 B2 | 9/2011 | Nguyen et al. |
| 8,088,010 B1 | 1/2012 | Hill |
| 8,241,116 B2 | 8/2012 | Ocko et al. |
| 8,539,073 B1 | 9/2013 | Dayan |
| 9,005,011 B2 | 4/2015 | Gagner et al. |
| 9,192,852 B2 | 11/2015 | Gagner et al. |
| 9,308,449 B2 | 4/2016 | Frattinger et al. |
| 9,345,955 B2 | 5/2016 | Gagner et al. |
| 2002/0042740 A1 | 4/2002 | Matsuoka |
| 2002/0049814 A1 | 4/2002 | Yoo |
| 2002/0094869 A1 | 7/2002 | Harkham |
| 2002/0183105 A1 | 12/2002 | Cannon et al. |
| 2003/0003988 A1 | 1/2003 | Walker et al. |
| 2003/0032479 A1 | 2/2003 | LeMay et al. |
| 2003/0045343 A1 | 3/2003 | Luccesi et al. |
| 2003/0060283 A1 | 3/2003 | Rowe |
| 2003/0073494 A1 | 4/2003 | Kalpakian et al. |
| 2003/0083943 A1 | 5/2003 | Adams et al. |
| 2003/0125107 A1 | 7/2003 | Cannon |
| 2003/0153377 A1 | 8/2003 | Lisowski, Sr. |
| 2003/0171145 A1 | 9/2003 | Rowe |
| 2003/0188306 A1 | 10/2003 | Harris et al. |
| 2003/0199313 A1 | 10/2003 | Gonen |
| 2003/0224852 A1 | 12/2003 | Walker et al. |
| 2004/0072619 A1 | 4/2004 | Brosnan et al. |
| 2004/0106446 A1 | 6/2004 | Cannon et al. |
| 2004/0242322 A1 | 12/2004 | Montagna et al. |
| 2005/0020358 A1 | 1/2005 | Cram |
| 2005/0026670 A1 | 2/2005 | Lardie |
| 2005/0037845 A1 | 2/2005 | Rozkin et al. |
| 2005/0054441 A1 | 3/2005 | Landrum et al. |
| 2005/0130728 A1 | 6/2005 | Nguyen et al. |
| 2005/0130737 A1 | 6/2005 | Englman et al. |
| 2005/0137015 A1 | 6/2005 | Rogers et al. |
| 2005/0148383 A1 | 7/2005 | Mayeroff |
| 2005/0159207 A1 | 7/2005 | Thomas |
| 2005/0181860 A1 | 8/2005 | Nguyen et al. |
| 2005/0227811 A1 | 10/2005 | Shum et al. |
| 2005/0239546 A1 | 10/2005 | Hedrick et al. |
| 2006/0073887 A1 | 4/2006 | Nguyen et al. |
| 2006/0073888 A1 | 4/2006 | Nguyen et al. |
| 2006/0100009 A1 | 5/2006 | Walker et al. |
| 2006/0111172 A1 | 5/2006 | Walker et al. |
| 2006/0121981 A1 | 6/2006 | Pfennighausen et al. |
| 2006/0148562 A1 | 7/2006 | Walker et al. |
| 2006/0172794 A1 | 8/2006 | Walker et al. |
| 2006/0189371 A1 | 8/2006 | Walker et al. |
| 2006/0194633 A1 | 8/2006 | Paulsen |
| 2006/0205492 A1 | 9/2006 | Linard et al. |
| 2006/0211470 A1 | 9/2006 | Walker et al. |
| 2006/0217199 A1 | 9/2006 | Adcox et al. |
| 2006/0240894 A1 | 10/2006 | Andrews |
| 2006/0252530 A1 | 11/2006 | Oberberger et al. |
| 2006/0258446 A1 | 11/2006 | Nguyen et al. |
| 2006/0287074 A1 | 12/2006 | Walker et al. |
| 2006/0287111 A1 | 12/2006 | Mitchell et al. |
| 2007/0060330 A1 | 3/2007 | Martin |
| 2007/0060346 A1 | 3/2007 | Edward |
| 2007/0077978 A1 | 4/2007 | Walker et al. |
| 2007/0093299 A1 | 4/2007 | Bergeron et al. |
| 2007/0111787 A1 | 5/2007 | Adams et al. |
| 2007/0122778 A1 | 5/2007 | Beitel et al. |
| 2007/0155509 A1 | 7/2007 | Wiltshire et al. |
| 2007/0167216 A1 | 7/2007 | Walker et al. |
| 2007/0178955 A1 | 8/2007 | Mills |
| 2007/0190494 A1 | 8/2007 | Rosenberg |
| 2007/0197296 A1 | 8/2007 | Lee |
| 2007/0243925 A1 | 10/2007 | LeMay et al. |
| 2007/0259713 A1 | 11/2007 | Fiden et al. |
| 2008/0020788 A1 | 1/2008 | Griswold et al. |
| 2008/0026838 A1 | 1/2008 | Dunstan et al. |
| 2008/0070669 A1 | 3/2008 | Walker et al. |
| 2008/0076506 A1 | 3/2008 | Nguyen et al. |
| 2008/0076548 A1 | 3/2008 | Paulsen |
| 2008/0132331 A1 | 6/2008 | Gatto et al. |
| 2008/0139306 A1 | 6/2008 | Lutnick et al. |
| 2008/0155006 A1 | 6/2008 | Franklin et al. |
| 2008/0167106 A1 | 7/2008 | Lutnick et al. |
| 2008/0171602 A1 | 7/2008 | Patel et al. |
| 2008/0181535 A1 | 7/2008 | Steiger |
| 2008/0188285 A1 | 8/2008 | Roelofs |
| 2008/0214296 A1 | 9/2008 | Yoshizawa |
| 2008/0248844 A1 | 10/2008 | Gadda et al. |
| 2009/0023489 A1 | 1/2009 | Toneguzzo |
| 2009/0023492 A1 | 1/2009 | Erfanian |
| 2009/0044113 A1 | 2/2009 | Jones et al. |
| 2009/0062017 A1 | 3/2009 | Kelly et al. |
| 2009/0070379 A1 | 3/2009 | Rappaport et al. |
| 2009/0082090 A1 | 3/2009 | Walker et al. |
| 2009/0093309 A9 | 4/2009 | Patel et al. |
| 2009/0117999 A1 | 5/2009 | Johnson et al. |
| 2009/0124384 A1 | 5/2009 | Smith et al. |
| 2009/0124386 A1 | 5/2009 | Lamontange |
| 2009/0143141 A1 | 6/2009 | Wells et al. |
| 2009/0149246 A1 | 6/2009 | Opaluch |
| 2009/0156179 A1 | 6/2009 | Hahn et al. |
| 2009/0157693 A1 | 6/2009 | Palahnuk |
| 2009/0158170 A1 | 6/2009 | Narayanan et al. |
| 2009/0209350 A1 | 8/2009 | Kelly et al. |
| 2009/0224476 A1 | 9/2009 | Grauzer et al. |
| 2009/0280891 A1 | 11/2009 | Filipour et al. |
| 2009/0286585 A1 | 11/2009 | Walker |
| 2009/0319058 A1 | 12/2009 | Rovaglio et al. |
| 2010/0009743 A1 | 1/2010 | Amaitis et al. |
| 2010/0077321 A1 | 3/2010 | Shen et al. |
| 2010/0105460 A1 | 4/2010 | Makhoul et al. |
| 2010/0121915 A1 | 5/2010 | Wang |
| 2010/0124967 A1 | 5/2010 | Lutnick et al. |
| 2010/0125732 A1 | 5/2010 | Cha et al. |
| 2010/0137067 A1 | 6/2010 | Kobayashi et al. |
| 2010/0197385 A1 | 8/2010 | Aoki et al. |
| 2010/0199160 A1 | 8/2010 | Klassen et al. |
| 2010/0210345 A1 | 8/2010 | Berman et al. |

(56) References Cited

U.S. PATENT DOCUMENTS

| | | |
|---|---|---|
| 2010/0210353 A1 | 8/2010 | Gagner et al. |
| 2010/0216532 A1 | 8/2010 | Halverson |
| 2010/0217686 A1 | 8/2010 | Craig et al. |
| 2010/0222134 A1 | 9/2010 | Gagner et al. |
| 2010/0227662 A1 | 9/2010 | Speer et al. |
| 2010/0227675 A1 | 9/2010 | Luxton et al. |
| 2010/0227682 A1 | 9/2010 | Reville et al. |
| 2010/0261517 A1 | 10/2010 | Gomez et al. |
| 2010/0287070 A1 | 11/2010 | Santeufemia et al. |
| 2010/0304848 A1 | 12/2010 | Detlefsen et al. |
| 2011/0001291 A1 | 1/2011 | Dusome et al. |
| 2011/0009188 A1 | 1/2011 | Adiraju et al. |
| 2011/0014975 A1 | 1/2011 | Grabiec et al. |
| 2011/0028203 A1 | 2/2011 | Agarwal et al. |
| 2011/0039610 A1 | 2/2011 | Baerlocher et al. |
| 2011/0053672 A1 | 3/2011 | Gagner et al. |
| 2011/0107241 A1 | 5/2011 | Moore |
| 2011/0122870 A1 | 5/2011 | Dixon et al. |
| 2011/0130184 A1 | 6/2011 | Mills |
| 2011/0143834 A1 | 6/2011 | Guinn et al. |
| 2011/0183737 A1 | 7/2011 | Suttle et al. |
| 2011/0190066 A1 | 8/2011 | Barclay et al. |
| 2011/0195766 A1 | 8/2011 | Toompere |
| 2011/0201414 A1 | 8/2011 | Barclay et al. |
| 2011/0207525 A1 | 8/2011 | Allen et al. |
| 2011/0218034 A1 | 9/2011 | Barclay et al. |
| 2011/0221694 A1 | 9/2011 | Karaoguz et al. |
| 2011/0263318 A1 | 10/2011 | Agarwal et al. |
| 2011/0312410 A1 | 12/2011 | Aoki et al. |
| 2012/0157193 A1 | 6/2012 | Arezina et al. |
| 2012/0277005 A1 | 11/2012 | Blackburn et al. |
| 2013/0130806 A1 | 5/2013 | Gagner et al. |
| 2013/0244767 A1 | 9/2013 | Barclay et al. |
| 2014/0106864 A1 | 4/2014 | Gagner et al. |
| 2014/0162783 A1 | 6/2014 | Frattinger et al. |
| 2016/0055701 A1 | 2/2016 | Gagner et al. |

FOREIGN PATENT DOCUMENTS

| | | |
|---|---|---|
| KR | 1020000024559 | 5/2000 |
| KR | 1020000036733 | 7/2000 |
| KR | 1020000036734 | 7/2000 |
| KR | 1020010096297 | 11/2001 |
| KR | 1020020011293 | 4/2002 |
| KR | 1020030088840 | 6/2005 |
| WO | 2006002084 | 1/2006 |
| WO | 2006033986 | 3/2006 |
| WO | 2006039306 | 4/2006 |
| WO | 2006105182 | 10/2006 |
| WO | 2007006002 | 1/2007 |
| WO | 2007030675 | 3/2007 |
| WO | 2007055774 | 5/2007 |
| WO | 2008021051 | 2/2008 |
| WO | 2008058279 | 5/2008 |
| WO | 2009007701 | 1/2009 |
| WO | 2009026305 | 2/2009 |
| WO | 2009026307 | 2/2009 |
| WO | 2009026308 | 2/2009 |
| WO | 2009026309 | 2/2009 |
| WO | 2009045972 | 4/2009 |
| WO | 2009114183 | 9/2009 |
| WO | 2010028064 | 3/2010 |
| WO | 2010042773 | 4/2010 |
| WO | 2010056892 | 5/2010 |
| WO | 2010056924 | 5/2010 |

OTHER PUBLICATIONS

"DoubleDown Casino", Facebook, No Publication Date Found, 5 pages.
Lamacraft, "Facebook Game Review: Casino City", Bright Hub, Jul. 20, 2010, 3 pages.
"Golden Nugget Vegas Casino", Facebook, No Publication Date Found, 4 pages.
"Casino City", Facebook, No Publication Date Found, 3 pages.
Co-Pending U.S. Appl. No. 12/968,269, filed Dec. 14, 2010, 52 pages.
Co-Pending U.S. Appl. No. 13/116,726, filed May 26, 2011, 41 pages.
Co-Pending U.S. Appl. No. 13/741,871, filed Jan. 15, 2013, 34 pages.
Co-Pending U.S. Appl. No. 13/890,080, filed May 8, 2013, 44 pages.
Co-Pending U.S. Appl. No. 13/295,056, filed Nov. 12, 2011, 45 pages.
Co-Pending U.S. Appl. No. 14/085,641, filed Nov. 20, 2013, 33 pages.
Co-Pending U.S. Appl. No. 14/932,650, filed Nov. 4, 2015, 40 pages.
"U.S. Appl. No. 13/204,203 Office Action", dated Feb. 10, 2017, 16 pages.
"Casino City of Facebook", YouTube, Nov. 2, 2010, 2 pages.
"Doubledown Casino Facebook Gameplay Preview", YouTube, Nov. 12, 2011, 2 pages.
"Golden Nugget Vegas Casino—Facebook Game", YouTube, Aug. 13, 2010, 2 pages.
"Leapfrog Online Bingo Software Review", garysmomsbingopage.com, Last date modified: Jul. 17, 2008, 1-2.
"PCT Application No. PCT/US08/78199 International Preliminary Report on Patentability", dated Sep. 14, 2010, 4 pages.
"PCT Application No. PCT/US08/78199 International Search Report", dated Dec. 8, 2008, 9 pages.
"PCT Application No. PCT/US08/80051 International Preliminary Report on Patentability", dated Nov. 19, 2009, 9 pages.
"PCT Application No. PCT/US08/80051 International Search Report", dated Dec. 12, 2008, 10 pages.
"PCT Application No. PCT/US09/60075 International Preliminary Report on Patentability", dated Sep. 20, 2010, 4 pages.
"PCT Application No. PCT/US09/60075 International Search Report", dated Jan. 26, 2010, 10 pages.
"PCT Application No. PCT/US11/46860 International Preliminary Report on Patentability", dated Aug. 6, 2012, 4 pages.
"PCT Application No. PCT/US11/46860 International Search Report", dated Jan. 5, 2012, 9 pages.
"U.S. Appl. No. 61/313,352", filed Mar. 12, 2010, 26 pages.
"U.S. Appl. No. 13/741,871 Office Action", dated Aug. 27, 2014, 12 Pages.
"U.S. Appl. No. 12/678,194 Office Action", dated Apr. 19, 2012, 16 pages.
"U.S. Appl. No. 12/681,985 Final Office Action", dated Nov. 17, 2013, 16 pages.
"U.S. Appl. No. 12/681,985 Final Office Action", dated Mar. 5, 2012, 15 pages.
"U.S. Appl. No. 12/681,985 Office Action", dated Oct. 12, 2011, 14 pages.
"U.S. Appl. No. 12/681,985 Office Action", dated Feb. 25, 2013, 13 pages.
"U.S. Appl. No. 12/681,985 Office Action", dated Apr. 22, 2014, 16 Pages.
"U.S. Appl. No. 12/968,269 Final Office Action", dated Jun. 5, 2013, 17 pages.
"U.S. Appl. No. 12/968,269 Office Action", dated Nov. 16, 2012, 31 pages.
"U.S. Appl. No. 12/968,269 Office Action", dated Feb. 22, 2013, 15 pages.
"U.S. Appl. No. 13/204,203 Final Office Action", dated Oct. 5, 2012, 18 pages.
"U.S. Appl. No. 13/204,203 Final Office Action", dated Mar. 28, 2016, 16 pages.
"U.S. Appl. No. 13/204,203 Office Action", dated Jun. 21, 2012, 22 pages.
"U.S. Appl. No. 13/204,203 Office Action", dated Apr. 11, 2015, 9 Pages.
"U.S. Appl. No. 13/204,203 Office Action", dated Jul. 5, 2013, 16 pages.
"U.S. Appl. No. 13/204,269 Final Office Action", dated Jan. 30, 2013, 25 pages.

(56) References Cited

OTHER PUBLICATIONS

"U.S. Appl. No. 13/204,269 Office Action", dated Sep. 18, 2015, 14 pages.
"U.S. Appl. No. 13/204,269 Office Action", dated Jul. 16, 2012, 24 pages.
"U.S. Appl. No. 13/295,056 Final Office Action", dated Dec. 10, 2015, 15 Pages.
"U.S. Appl. No. 13/295,056 Final Office Action", dated May 21, 2014, 18 Pages.
"U.S. Appl. No. 13/295,056 Non Final Office Action", dated Apr. 1, 2013, 17 pages.
"U.S. Appl. No. 13/295,056 Office Action", dated Apr. 14, 2015, 15 Pages.
"U.S. Appl. No. 13/581,722 Office Action", dated Feb. 6, 2014, 14 Pages.
"U.S. Appl. No. 13/581,722 Office Action", dated Jul. 5, 2013, 26 pages.
"U.S. Appl. No. 131/41,871 Final Office Action", dated Mar. 5, 2015, 13 Pages.
"U.S. Appl. No. 13/741,871 Office Action", dated Mar. 18, 2014, 12 Pages.
"U.S. Appl. No. 13/741,871 Office Action", dated Aug. 24, 2015, 5 Pages.
"U.S. Appl. No. 13/890,080 Final Office Action", dated Nov. 9, 2015, 12 Pages.
"U.S. Appl. No. 13/890,080 Office Action", dated Jun. 12, 2015, 8 Pages.
"U.S. Appl. No. 14/085,641 Office Action", dated Sep. 20, 2016, 34 pages.
"U.S. Appl. No. 14/106,415 Office Action", dated Mar. 31, 2016, 6 pages.
"U.S. Appl. No. 14/133,334 Final Office Action", dated Apr. 2, 2015, 14 Pages.
"U.S. Appl. No. 14/133,334 Office Action", dated Oct. 15, 2014, 13 Pages.
"U.S. Appl. No. 14/179,189 Final Office Action", dated Jul. 29, 2015, 8 Pages.
"U.S. Appl. No. 14/179,189 Office Action", dated Nov. 14, 2015, 7 Pages.
"U.S. Appl. No. 14/932,650 Office Action", dated Aug. 29, 2016, 9 pages.
"U.S. Appl. No. 15/133,031 Office Action", dated Sep. 23, 2016, 6 pages.

CONTROLLING WAGERING GAME SYSTEM BROWSER AREAS

RELATED APPLICATIONS

This application is a continuation application that claims the priority benefit of U.S. patent application Ser. No. 15/133,031 filed 19 Apr. 2016, which is a continuation application that claims the priority benefit of U.S. application Ser. No. 13/204,269 filed 5 Aug. 2011, which claims the priority benefit of U.S. Provisional Application Ser. No. 61/371,283 filed Aug. 6, 2010.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010-2017, Bally Gaming, Inc.

TECHNICAL FIELD

Embodiments of the inventive subject matter relate generally to wagering game systems and networks that, more particularly, control wagering game system browser areas.

BACKGROUND

Group wagering games are becoming increasingly popular. Group wagering games, or "community" wagering games, are wagering games where a group of players can play the same wagering game, or experience a group gaming event, at the same time, in a competitive or collaborative setting, or as common observers or participants. Group wagering games, however, present specific challenges in gaming. Group wagering games may integrate multiple wagering game player accounts ("player accounts"), each of which have different account balances, preferences, playing histories, etc. Further, in group wagering games, multiple players can perform different actions during a single game any of which may contribute to common or conflicting goals. Tracking the different actions can be a complex task for gaming resources, equipment, software, etc. As a result, wagering game manufacturers, casino operators, and online game providers are constantly in need of innovative concepts that can control interaction and integration of multiple player accounts and multiple player actions in group wagering games.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into five sections. The first section provides an introduction to embodiments. The second section describes example operating environments while the third section describes example operations performed by some embodiments. The fourth section describes additional example operating environments while the fifth section presents some general comments.

Introduction

This section provides an introduction to some embodiments.

Wagering games are expanding in popularity. Many wagering game enthusiasts are demanding greater access to wagering games and content related to wagering games. Some wagering game companies have begun to see the value of incorporating social networks and social networking functionality into wagering game features. For example, some wagering game providers allow users to personalize their gaming experiences using online personas (e.g., online screen names, avatars, online chat features, etc.). These online personas add to the fun of belonging to a social network. Some embodiments of the present invention combine online technologies with wagering games and group environments in ways that allow players to interact with each other, and with wagering games devices, in new and exciting ways. For example, FIG. 1 is a conceptual diagram that illustrates an example of presenting and controlling browser areas and game objects on an electronic wagering game table, according to some embodiments.

Figure 1:
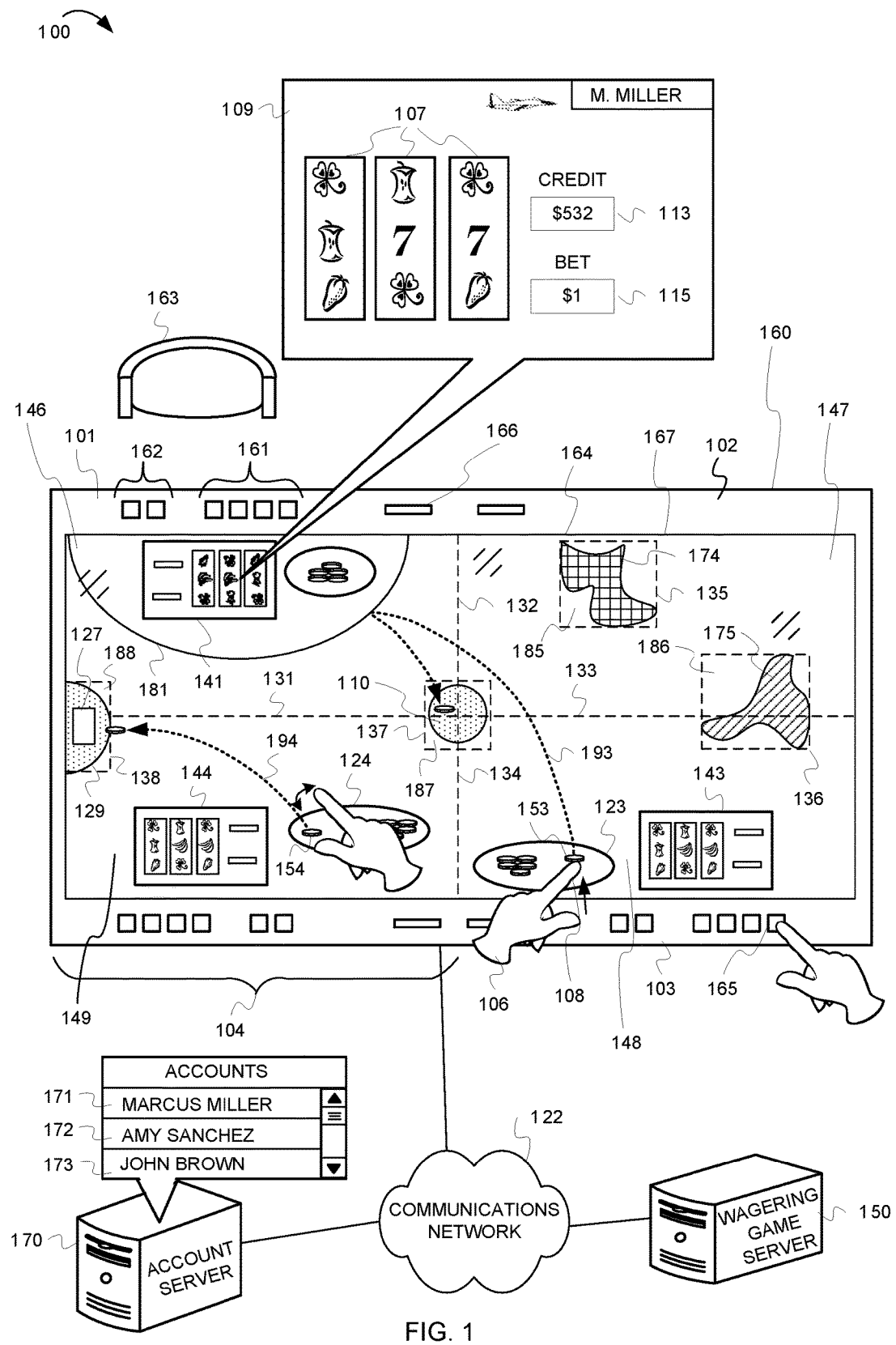
FIG. 1 is an illustration of presenting and controlling browser areas and game objects on an electronic wagering game table, according to some embodiments.

In FIG. 1, a wagering game system ("system") 100 includes an electronic wagering game table ("e-table") 160 connected to a wagering game server 150 and an account server 170 via a communications network 122. The e-table 160 has multiple player stations 101, 102, 103 and 104 at which multiple players can login to player accounts 171, 172, and 173 hosted by the account server 170. For example, a player account (i.e., Marcus Miller) can access (e.g., login to) the player account 171 (i.e., the "Marcus Miller" account) via the player station 101. A first player (i.e., Marcus Miller) can sit at a chair 163. Once the player account 171 is logged in to the player station 101, the e-table 160 can present controls (e.g., user-configurable controls 161 and game play controls 162) on a digital button panel. The e-table 160 can determine a player preference for presenting the controls. For example, the player account 172 (i.e., the "Amy Sanchez" account) can login to the player station 103. A second player (i.e., Amy Sanchez) can sit or stand at the player station 103. The e-table 160 can read player preferences for the second player, Amy Sanchez, and determine that she is left-handed. Thus, the e-table 160 presents the controls in a left-handed configuration.

Returning to the description of the player station 101, the player, Marcus Miller, can login to the player station 101 by inserting, touching, swiping, etc. a player card to a login mechanism 166. The system 100 can initiate a wagering game at a gaming console 141 for the player account 171. Each of the player stations 101, 102, 103, and 104 may have gaming consoles. For example, the player station 103 presents a gaming console 143 for use with the player account 172. The player station 104 presents a gaming console 144 for use with the player account 173, the "John Brown" account, for a player, John Brown, stationed at player station 104. The e-table 160 may or may not present a gaming console or controls at player station 102. For example, if a player account is not logged in at the player station 102, the e-table 160 may not present a gaming console. In other embodiments, however, regardless of login, the e-table 160 may show a gaming console, such as for anonymous play.

The gaming console 141 can present slot reels 107, a credit meter 113, and a bet meter 115 for a primary wagering game 109, or base game, played by the player, Marcus Miller, via the player account 171, at the player station 101. The primary wagering game 109 can be independent of any other wagering games played at the other player stations 103 and 104 using the other player accounts 172, and 173. In other words, the system 100 can transact bets and provide rewards only for the player account 171 for the game play that occurs within the gaming console 141. Therefore, the gaming console 141 can function as a wagering game machine only for the player account 171. In other words, the gaming console 141 does not have to be used for community wagering games, but can be used strictly for individual wagering games played by a single player. Likewise, gaming consoles 143 and 144 can function as separate wagering game machines respectively for the player accounts 172 and 173. The game play controls 162 can be used for the primary wagering game 109, such as to spin the reels 107 or to modify a bet amount in the bet meter 115. The user-configurable controls 161, however, can be used to control community wagering game activity, or to control interactions across the e-table 160 with objects presented on the e-table 160. Further, the gaming console 141 can present more than one primary wagering game concurrently. As a result, the game play controls 162 can support game play activity for multiple games played concurrently.

The e-table 160 manages browser areas of a shared graphical display ("display") 164. The e-table 160 is configured with an operating system that can present multiple browser areas on the display 164. For instance, the display 164 can present multiple browser areas contained within one or more web browsers that manage (e.g., contain, control, present, etc.) objects, activities, events, etc. related to primary wagering game activity and/or secondary wagering game activity, such as bonus games and community, or group, games. The areas within the one or more web browsers or "browser areas," in one example, may be separate areas of a single browser (e.g., areas contained within one instance of a browser application that encompasses the entire display 164). In another example, browser areas may be in separate, but adjacent browsers (e.g., contained within separate instances of a browser application within the display 164), with transparent boundaries that look seamless when presented next to each other. In yet other examples, one group of browser areas may be contained within one browser while other groups of browser areas may be contained within other browsers. In yet other examples, some browser areas may be in a first browser that temporarily takes control of (e.g. expropriates or dominates control of) a portion of second browser by, for example, overlapping, blending, layering, displacing, etc. the portion of the second browser and controlling the portion of the second browser that was overlapped, blended, displaced, layered, etc. In some embodiments, the e-table 160 may utilize one or more browser instances on the shared display 164. In some embodiments, if the e-table 160 presents different browsers, some of the browsers can run different types of technology (e.g., one browser can run Adobe® Flash®, one browser can run Microsoft® Silverlight®, etc.).

In some embodiments, the system 100 can pre-load a configuration that specifies browser areas for all objects and for player stations. For example, in some embodiments, the browser areas 146, 147, 148, 149, respectively correspond to, or are assigned to, the player stations 101, 102, 103 and 104. Player stations 101, 102, 103 and 104 are portions of the e-table 160 that players can use individually to play wagering games and to participate is wagering game activities. Thus, in some embodiments, a player station may include the controls (e.g., buttons, panels, etc.) that a player uses to control activity at the e-table 160. In some embodiments, a player station may also include areas of the display 164 that are under control of a player that is using a player station. For instance, the browser area 146 is bounded by transparent boundaries 131 and 132 and a border 167 of the display 164, which define a quadrant of the e-table 160 generally assigned to the player station 101. Similarly, the browser area 147 is bounded by transparent boundaries 132 and 133 and the border 167, which define a quadrant of the e-table 160 generally assigned to the player station 102. Likewise, the browser area 148 is bounded by transparent boundaries 133 and 134 and the border 167, which define a quadrant of the e-table 160 generally assigned to the player station 103. Further, the browser area 149 is bounded by transparent boundaries 134 and 131 and the border 167, which define a quadrant of the e-table 160 generally assigned to the player station 104. In some embodiments, because no player account is logged into the player station 102, the system 100 can use the browser area 147 at the player station 102 for game play performed at player stations 101, 103 and 104.

The system 100 can also assign other browser areas to players/player accounts, such as browser areas 185 and 186. The browser area 185 is bounded by the transparent boundary 135 and includes a customized graphical image of a game zone 174. A game zone is a portion of one or more browser areas that measures progress in a community wagering game. The customized graphical image of the game zone 174 is contained within the browser area 185. The system 100 assigns the customized graphical image of the game zone 174 to the player account 172 for performing a specific activity or accomplishing a goal in the primary wagering game 109 or in a secondary wagering game, such as a community game that awards zones to players and presents the zones on the display 164. For example, the customized graphical image of the game zone 174 can be part of a territory-based strategy game, such as the board game "Risk," which presents occupied territories that players earn through game play, with a game objective of controlling territory, or more strategically using controlled territories, to win the game.

In some embodiments, the system 100 can present a browser or browser area on top of other browsers or browser areas (e.g., overlap or layer the browsers or browser areas)

with transparent browser imaging. For example, the system 100 overlays the browser area 185 over the browser area 147 and overlays the browser area 186 over both the browser area 147 and 148.

In some embodiments, the system 100 can customize browser areas and/or game zones within a browser area to signify that the browser area and/or game zone belongs to, or is assigned to a specific player (e.g., belongs to or is assigned to a specific player station or player account) or to signify a location in which an object or game asset resides. For example, the system 100 can customize the graphical image of the game zone 174 in the browser area 185 (e.g., present a specific color, a specific pattern, a specific shading, a specific border, a specific graphic, etc.) to signify that the graphical image of the game zone 174 belongs to, or is assigned to, the player account 171 at the player station 101. The system 100 can present graphical image of the game zone 174 or the graphical in a browser area that is not assigned to the player account 171. For instance, the graphical image graphical of the game zone 174 is overlain onto the browser area 147 even though the browser area 147 is assigned to the second player station 102 instead of player station 101. For the purposes of the game, however, the system 100 indicates that the graphical image of the game zone 174 belongs to the first player account 171 assigned to player station 101, by customizing the appearance of the graphical image of the game zone 174 with custom colors, patterns, images, etc. specified by the player account 171. In another example, the system 100 overlays the browser area 186 over a portion of the browser area 147 and over a portion of the browser area 148 so that the system 100 can present an additional customized graphical image of a game zone 175 within the browser area 186. The browser area 186 is bounded by a transparent boundary 136. The customized graphical image of the game zone 175 is customized to indicate that the player account 172 or player account 173 has earned, or been awarded, the graphical image of the game zone 175.

In some embodiments, the system 100 can present a graphical image of a container object 110 that overlaps one or more other browser areas (e.g., overlaps the browser areas 146, 147, 148, and 149). The graphical image of the container object 110 becomes an active feature on the display 164. The graphical image of the container object 110 can dominate, supplant, replace, or take control over the overlapped portions of the browser areas 146, 147, 148, and 149 so that graphical image of the container object 110 interacts with, absorbs, deflects, reacts to, etc. other objects that a player flicks, flips, pushes, tosses, shoots or otherwise directs to the graphical image of the container object 110. For example, a player can perform a gesturing motion that indicates an intention to send a graphical image of a money object (e.g., a graphical image of a coin 153) to the graphical image of the container object 110 as part of a community wagering game or as part of other gaming activity or social activity at the e-table. For instance, a player at the player station 103 can perform a gesture above a surface of the display 164 that appears to strike the graphical image of the coin 153 with a physical object within the player's control (e.g., with a finger 108 on a hand 106, with an instrument held in the hand 106, etc.). The player's gesture can indicate a trajectory 193 for the graphical image of the coin 153 to follow from a graphical image of a money holding area 123 on the browser area 148 to the browser area 187 that contains the graphical image of the container object 110 within a browser area boundary 137. In some embodiments, the trajectory 193 can lead directly to the graphical image of the container object 110 based on physics rules applied to the graphical environment of the display 164. Other embodiments, however, the system 100 can cause the trajectory 193 to curve around objects, bounce off objects, perform actions, etc. en route to a final destination (e.g., en route to the graphical image of the container object 110). For instance, the player at player station 103 can perform a gesture that indicates that the graphical image of the coin 153 should curve around the graphical image of the container object 110, passing through the browser area 147 into the browser area 146 and bounce off of a player specified barrier 181 into the graphical image of the container object 110. The player specified barrier 181 can be specified (e.g., drawn by, activated by, etc.) a player at the player station 101.

Figure 2:
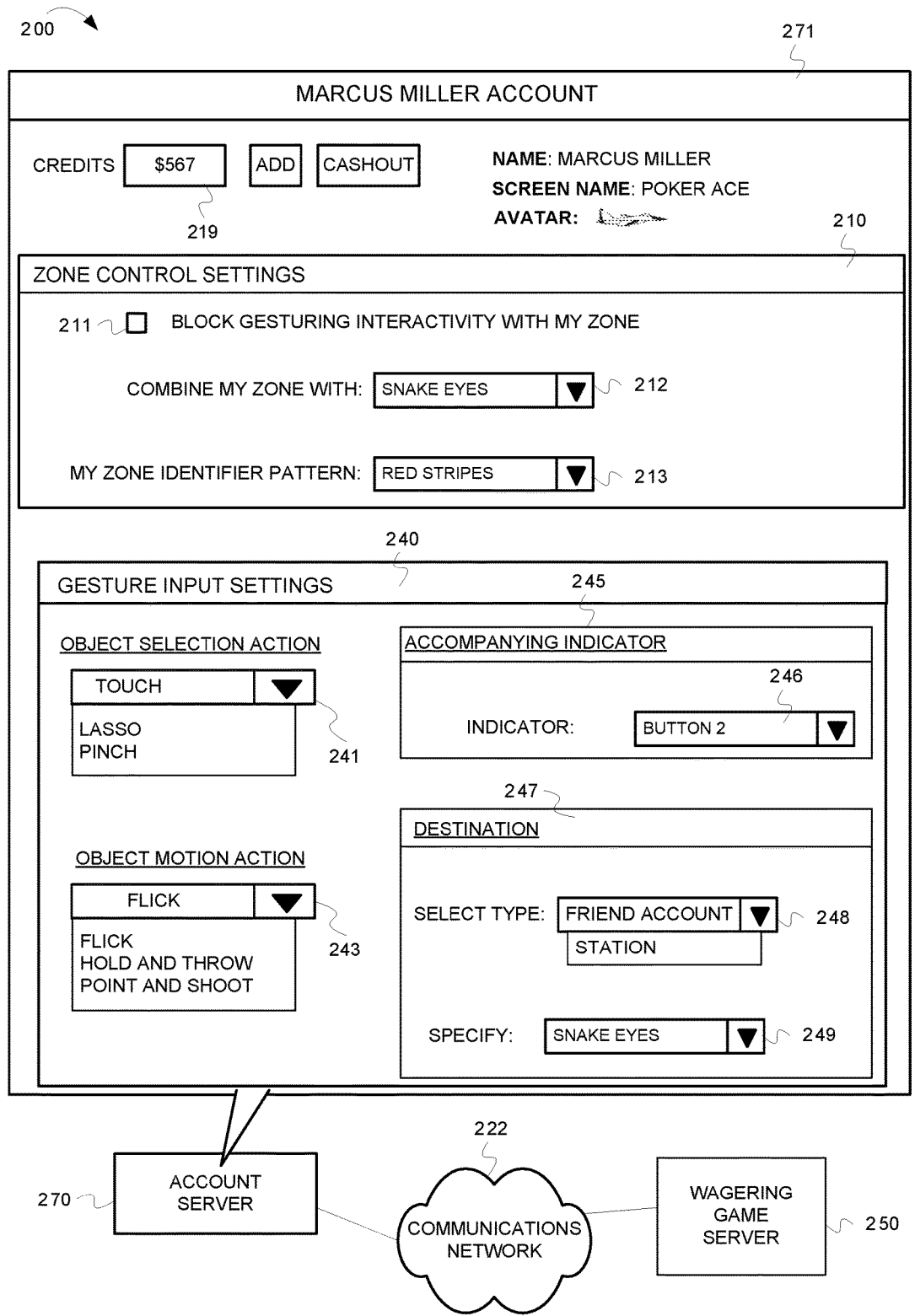
FIG. 2 is an illustration of using player settings and preferences to control web browser areas and objects, according to some embodiments.

In some embodiments, the system 100 can detect settings from a player account (e.g., player account 172) logged in at the player station 103. The settings can indicate an indicator that accompanies a player gesture. The indicator can specify a specific action (e.g., a secondary gesture, a pressing of a button, etc.) that specifies one or more characteristics of the player's gesture. For example, the setting can indicate that the player at player station 103 presses a button 165 simultaneously with performing the gesture with the hand 106 and the finger 108. The player at player station 103 may set a setting in the player account 172 that indicates that button 165, when pressed, specifies that the graphical image of the coin 153 has a final destination at the graphical image of the container object 110 regardless of where, or how, the graphical image of the coin 153 bounces. In other words, the player setting can indicate a final destination point or location for a trajectory for the graphical image of the coin object 153. Other settings may indicate other accompanying indicators that specify other destinations for the graphical image of the coin object 153. FIG. 2, described further below, illustrates an example of specific settings for a player account.

Referring still to FIG. 1, the display 164 is interactive and multiple players can touched, or otherwise interact, with the display 164 at the same time. For example, players that correspond to the player accounts 171, 172, and 173 share the display 164. The e-table 160 can detect when the players touch the display 164 simultaneously, and can manage, or coordinate, activities in primary wagering games as well as activities in a community game that occur concurrently. Each of the player stations 101, 102, 103 and 104 can present primary wagering games (e.g., slot games, poker games, blackjack games, etc.) that each of the player's can play in their respective browser areas 146, 147, 148 and 149. However, the system 100 can also present community game features where all players can perform a similar function in one common, or community location, such as flicking coins into a central pot (e.g., into the graphical image of the container object 110). In other words, the system 100 can coordinate, track, and control movements of objects for a community game while multiple touching occurs simultaneously, or concurrently, with player activity in a primary wagering game.

In some embodiments, the system 100 can detect a placement of a user account identifier, such as a user card, symbol, or other device (user device) 127. For example, a member of a waiting staff at a casino can place a staff card on the display 164 or a player can place a player card on the display 164. A user can place the user device 127 on any portion of any existing browser area on the e-table 160. For instance, a user placed the user device 127 on a portion of the browser area 149 and on a portion of the browser area 146. The system 100 recognizes the location of the user device 127 then generates and presents a browser area 188, bounded by transparent boundary 138, which overlaps portions of the browser area 146 and 149. The system 100 can present a graphical image of a container object 129 within the browser area 188. The graphical image of the container object 129 surrounds the shape of the user device 127. The system 100 presents the browser area 188 temporarily, while the player device 127 is on the display 164. Further, the browser areas 146 and 149 do not have to resize to accommodate the browser area 188 because the browser area 188 overlaps the browser areas 146 and 149. In other embodiments, however, the system 100 can modify, or reshape, the browser areas 146 and 149 to accommodate the browser area 188.

The system 100 can detect identifiers associated with the user device 127, such as identification symbols or text, radio-frequency identifiers, barcodes, etc. The system 100 can access a user account associated with the user device 127 based on the identifiers for the user device 127. In some embodiments, the system 100 can detect when a player, such as a player at player station 104, performs a gesture to a money object, such as flipping or pushing a graphical image of a coin 154 from a graphical image of a money holding area 124 to the container object 129 along a trajectory 194. When the graphical image of the coin 154 interacts with the graphical image of the container object 129 (e.g., touches or is captured by the graphical image of the container object 129), the system 100 can deduct an amount of money associated with the graphical image of the coin 154 from the player account (e.g., from player account 173) and add it to an account associated with the user device 127. The graphical image of the coin 154 can have a money value assigned to it by the player account 173. The player at player station 104, therefore, in some embodiments, can pay a waiting staff a tip equaling to the money value assigned to the graphical image of the coin 154. In other embodiments, the player at player station 104 can transfer money to a dealer, or share money with other players.

Further, some embodiments of the inventive subject matter describe examples of controlling wagering game system browser areas in a network wagering venue (e.g., an online casino, a wagering game website, a wagering network, etc.) using a communication network, such as the communications network 122 in FIG. 1. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, in some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may activate a game control or device to perform the action, control the item, communicate the information, etc., the player account, at the computer level, can be associated with the player, and therefore any actions associated with the player can be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Although FIG. 1 describes some embodiments, the following sections describe many other features and embodiments.

Example Operating Environments

This section describes example operating environments and networks and presents structural aspects of some embodiments. More specifically, this section includes discussion about wagering game systems and wagering game system architectures.

Using Player Settings and Preferences to Control Web Browser Areas and Objects

FIG. 2 is a conceptual diagram that illustrates an example of using player settings and preferences to control web browser areas and objects, according to some embodiments. In FIG. 2, a wagering game system ("system") 200 includes an account server 270 connected to a wagering game server 250 via a communications network 222. The account server 270 hosts a player account 271. The player account 271 includes information about a player, such as a player's name, screen name, avatar, etc. The player account 271 can also include financial information, such as a credit balance shown in a credit balance meter 219. The player account 271 can further include gesture input settings 240. The gesture input settings 240 can include accompanying indicator settings 245 that specify, via an indicator control 246, that the player account 271 desires a specific player input device, such as "button 2" on an e-table (e.g., a second button at a player station at the e-table), to specify a destination setting 247. The destination setting 247 can include a destination type (e.g., a friend account, a player station, etc.) specified in a destination type control 248. For instance, if the player account 271 specifies that the destination type for the "button 2" is a "friend account," then the system 200 can populate a specification control 249 with names of friends that belong to, or are associated with, the player account 271. For example, one player account associated with player account 271 is an account for a social contact whose screen name, or nickname, is "Snake Eyes." The system 200, therefore, based on the accompanying indicator settings 245 specifies that when a player presses "button 2" on an e-table, then simultaneously performs a gesture to flip, flick, etc., a graphical image of an object across an e-table display, then the system 200 should cause the graphical image of the object to end up at any station, location, object, etc. associated with the player account for "Snake Eyes." In other words, the system 200 can set a trajectory end-point to be at a player station at which "Snake Eyes" is logged in.

The gesture input settings 240 can also specify preferred actions involved in a gesture, such as an object selection action control 241, which specifies a preferred type of action that the player can perform to select an object to be gestured (e.g., a finger touch on a display, a lasso movement by a finger on a display, etc.). The gesture input settings 240 can also specify, via an object motion action control 243, a preferred type of action that moves, or initiates movement of, objects within player control on an e-table, such as a finger flick motion, a hold-and-throw motion, a point and shoot motion, etc.

Other user settings may include zone control settings 210 associated with browser areas. For example, a checkbox 211 can indicate a player preference for blocking interactivity with other objects moved by gesturing at an e-table. For instance, if the checkbox 211 were checked, then, when the player account logs in at an e-table, a player specified barrier may immediately appear at player station at which the player account 271 logged in. Still referring to FIG. 2, the zone control settings 210 may further include a zone combination control 212 that can combine zones earned during games at an e-table with other player accounts. Another setting, a zone customization control 213, can specify a player preference for how a game zone at an e-table will appear to indicate that it belongs to, or has been assigned to (e.g. awarded to) the player account 271.

Presenting and Controlling Browser Areas and Objects on a Computer

Figure 3:
FIG. 3 is an illustration of presenting and controlling browser areas and objects on a computer, according to some embodiments.

FIG. 3 is a conceptual diagram that illustrates an example of presenting and controlling browser areas and objects on a computer, according to some embodiments. In FIG. 3, a wagering game system ("system") 300 presents browser areas on a browser 301 presented by a computer 337. The system 300 includes the computer 337 connected to a wagering game server 350 and an account server 370 via a communications network 322, such as the Internet. The browser 301 presents a webpage 303 for an online gaming venue, such as an online casino or online gaming website (e.g., "JackPot Party.Com"). The webpage 303 includes a game interface 340 for a community wagering game (e.g., "Dragon Quest"). In the community game several player accounts, including player account 371 hosted by the account server 370, can be logged in for a gaming session on the online gaming venue associated with the webpage 303. The player account 371, for example, may be associated with a player that uses the computer 337. The browser 301 presents, on the webpage 303, separate browser areas 341, 342, 343, and 344. The browser areas 341, 342, 343, and 344 may all be included in one browser instance controlled by the computer 337. The system 300 separates a portion of the webpage (e.g., the game interface 340) into the browser areas 341, 342, 343, and 344 via boundaries 331, 332, 333, and 334, similar to the boundaries 131, 132, 133, and 134 shown in FIG. 1. A player at the computer 337 can, via the player account 371, perform activities on the webpage 303 that utilize, or interact with, the browser areas 341, 342, 343, and 344. For example, the player account 371 can play a wagering game within the browser area 344 (e.g., using the spin control 317 and the bet control 315). In another example, a player can use the mouse 393 and/or the keyboard 395 to perform gesturing and accompanying inputs that specify movement of objects from one area, such as browser area 344, to browser area 341 or browser area 343. For instance, a player can place a mouse cursor 310 over a credit meter 313 from a primary wagering game played within a console 384 in the browser area 344. The player can click and hold a mouse button on the mouse 393, then move the mouse 393 up (toward the browser area 341), with a quick upward movement, and release the mouse button, causing a graphical image of a coin 351 to travel to the browser area 341 along a trajectory 391. The browser area 341 is assigned to a player account (e.g., the "Johnny 7s" player account for the player whose screen name is "Johnny 7s"). The browser area 344 is assigned to the player account 371, whose screen name, or nickname, is "Poker Ace." The system 300 can cause the graphical image of the coin 351 to travel from the browser area 344, assigned to the player account 371, along the trajectory 391, to a container section 381 of the browser area 341. The player can also specify an accompanying input, such as the "F1" button on the keyboard 395 indicating that the graphical image of the coin 351 is intended for the final destination of the container section 381. The player account 371 can store a setting indicating accompanying inputs, as shown in FIG. 2. Still referring to FIG. 3, once the graphical image of the coin 351 enters a specific portion of the browser area 341 (e.g. enters the container section 381), or is captured by a container object associated with the browser area 341, the system 300 can deduct an amount of credits associated with the graphical image of the coin 351 and add the amount of credits to the player account for "Johnny 7s."

In another example, a player may gesture for an inventory item, such as a dragon hat 354 associated with the community wagering game, to move from an inventory 364 in the console 384 to the browser area 343. For instance, the player can click and hold a mouse button on the mouse 393, then move the mouse 393 right (toward browser area 333), with a quick rightward movement, and release the mouse button, causing a graphical image of the dragon hat 354 to move along a trajectory 392 to a container section 383 of the browser area 343. The player can also hold down the "F2" button on the keyboard 395 indicating that the graphical image of the dragon hat 354 is intended for the final destination of the container section 383. The system 300 can then add the dragon hat 343 to an inventory for the receiving player account (i.e., to an inventory for the "Snake Eyes" player account) and, likewise, deduct an instance of the dragon hat 354 from the inventory 364.

Wagering Game System Architecture

Figure 4:
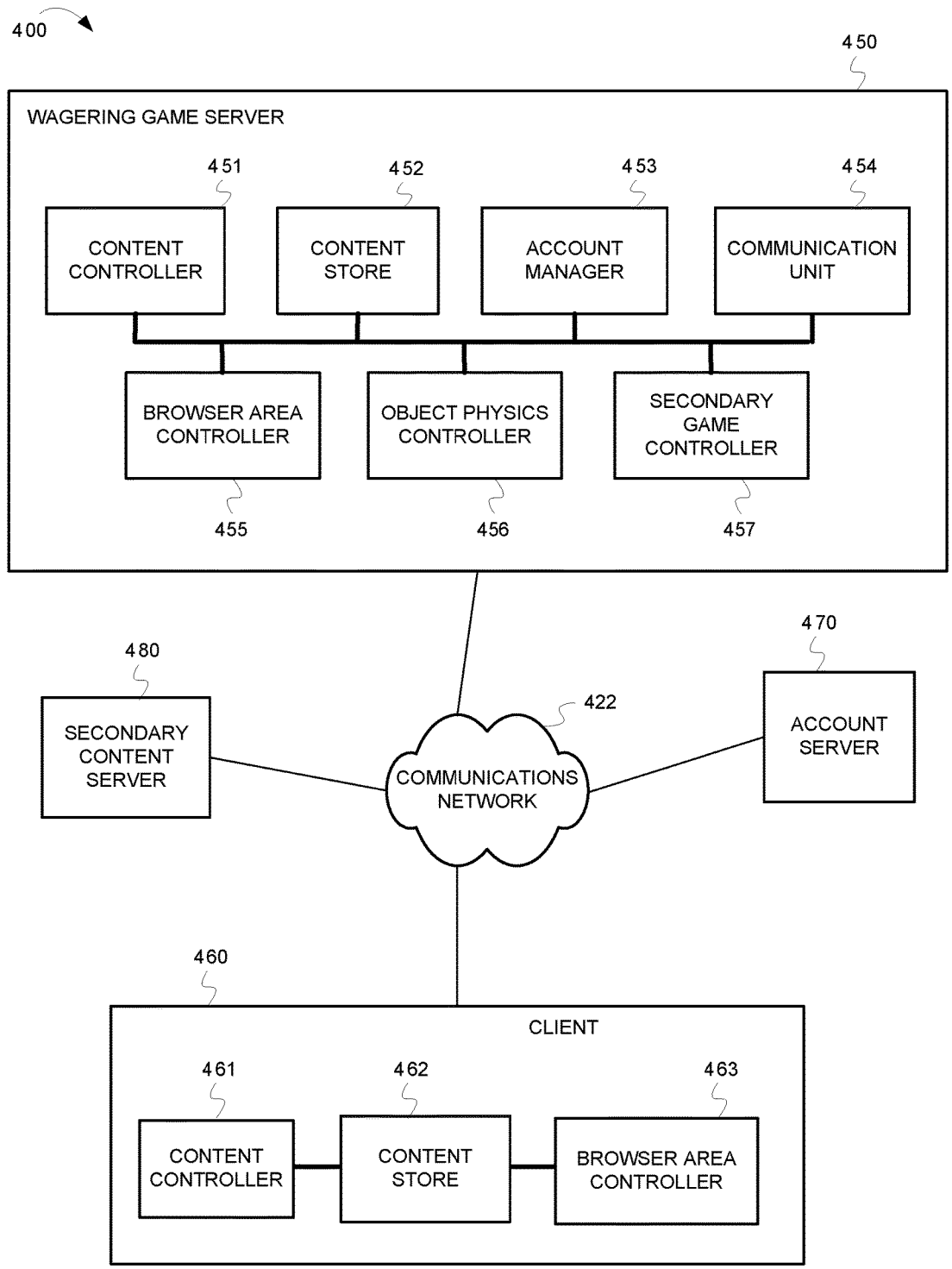
FIG. 4 is an illustration of a wagering game system architecture 400, according to some embodiments.

FIG. 4 is a conceptual diagram that illustrates an example of a wagering game system architecture 400, according to some embodiments. The wagering game system architecture 400 can include an account server 470 configured to control user related accounts accessible via wagering game networks and social networking networks. The account server 470 can store wagering game player account information, such as account settings (e.g., settings related to group games, settings related to social contacts, settings related to browser areas, settings related to gesturing, etc.), preferences (e.g., player preferences regarding gesturing motions, player preferences regarding secondary content presentation, player preferences regarding award types, preferences related to virtual assets, etc.), player profile data (e.g., name, avatar, screen name, etc.), and other information for a player's account (e.g., financial information, account identification numbers, virtual assets, social contact information, etc.). The account server 470 can contain lists of social contacts referenced by a player account. The account server 470 can also provide auditing capabilities, according to regulatory rules. The account server 470 can also track performance of players, machines, and servers.

The wagering game system architecture 400 can also include a wagering game server 450 configured to control wagering game content, provide random numbers, and communicate wagering game information, account information, and other information to and from a client 460. The wagering game server 450 can include a content controller 451 configured to manage and control content for the presentation of content on the client 460. For example, the content controller 451 can generate game results (e.g., win/loss values), including win amounts, for games played on the client 460. The content controller 451 can communicate the game results to the client 460. The content controller 451 can also generate random numbers and provide them to the client 460 so that the client 460 can generate game results. The wagering game server 450 can also include a content store 452 configured to contain content to present on the client 460. The wagering game server 450 can also include an account manager 453 configured to control information related to player accounts. For example, the account manager 453 can communicate wager amounts, game results amounts (e.g., win amounts), bonus game amounts, etc., to the account server 470. The wagering game server 450 can also include a communication unit 454 configured to communicate information to the client 460 and to communicate with other systems, devices and networks. The wagering game server 450 can also include a browser area controller 455 configured to manage (e.g., present, control, move, coordinate, etc.) one or more browsers and areas in the one or more browsers for the client 460. The wagering game server 450 can also include an object physics controller 456 configured to control movement of objects between browser areas. For example, the object physics controller 456 can move objects seamlessly across browsers and browser areas based on player gestures. The wagering game server 450 can also include a secondary game controller 457 configured to control secondary wagering games, such as community wagering games that multiple players participate in via the client 460 (e.g., via one or more player stations at the client 460, via one or more computers on the Internet, etc.).

The wagering game system architecture 400 can also include the client 460 configured to present wagering games and receive and transmit information to control wagering game system browser areas. The client 460 can be a computer system, a personal digital assistant (PDA), a cell phone, a laptop, a wagering game machine (e.g., an electronic wagering game table, a standing wagering game machine, etc.), or any other device or machine that is capable of processing information, instructions, or other data provided via a communications network 422. The client 460 can include a content controller 461 configured to manage and control content and presentation of content on the client 460. The client 460 can also include a content store 462 configured to contain content to present on the client 460. The client 460 can also include a browser area controller 463 configured to manage (e.g., present, control, move, coordinate, etc.) one or more browsers and areas in the one or more browsers for the client 460. The browser area controller 463 can also be configured to control movement of objects between browser areas. For example, the browser area controller can move objects seamlessly across browsers and browser areas based on player gestures.

The wagering game system architecture 400 can also include a secondary content server 480 configured to provide content and control information for secondary games and other secondary content available on a wagering game network (e.g., secondary wagering game content, promotions content, advertising content, player tracking content, web content, etc.). The secondary content server 480 can provide "secondary" content, or content for "secondary" games presented on the client 460. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. In some embodiments, the secondary content server 480 can provide and control content for community games, including networked games, social games, competitive games, or any other game that multiple players can participate in at the same time. In some embodiments, the secondary content server 480 can control and present an online website that hosts wagering games. The secondary content server 480 can also be configured to present multiple wagering game applications on the wagering game machine 460 via a wagering game website, or other gaming-type venue accessible via the Internet. The secondary content server 480 can host an online wagering website and/or a social networking website. The secondary content server 480 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). In some embodiments, the secondary content server 480 can also host social networking accounts, provide social networking content, control social networking communications, store associated social contacts, etc. The secondary content server 480 can also provide chat functionality for a social networking website, a chat application, or any other social networking communications mechanism. In some embodiments, the secondary content server 480 can utilize player data to determine marketing promotions that may be of interest to a player account. The secondary content server 480 can also analyze player data and generate analytics for players, group players into demographics, integrate with third party marketing services and devices, etc. The secondary content server 480 can also provide player data to third parties that can use the player data for marketing.

Each component shown in the wagering game system architecture 400 is shown as a separate and distinct element connected via a communications network 422. However, some functions performed by one component could be performed by other components. For example, the wagering game server 450 can also be configured to perform functions of the browser area controller 463, and other network elements and/or system devices. Furthermore, the components shown may all be contained in one device, but some, or all, may be included in, or performed by, multiple devices, as in the configurations shown in FIG. 4 or other configurations not shown. For example, the account manager 453 and the communication unit 454 can be included in the client 460 instead of, or in addition to, being a part of the wagering game server 450. Further, in some embodiments, the client 460 can determine wagering game outcomes, generate random numbers, etc. instead of, or in addition to, the wagering game server 450.

As mentioned previously, in some embodiments, the client 460 can take the form of a wagering game machine. Examples of wagering game machines can include floor standing models, handheld mobile units, bar-top models, workstation-type console models, surface computing machines, wagering game tables, etc. Further, wagering game machines can be primarily dedicated for use in conducting wagering games, or can include non-dedicated devices, such as mobile phones, personal digital assistants, personal computers, etc.

In some embodiments, clients and wagering game servers work together such that clients can be operated as thin, thick, or intermediate clients. For example, one or more elements of game play may be controlled by the client or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the clients can present a graphical representation of such outcome or asset modification to the user (e.g., player). In a thick-client example, the clients can determine game outcomes and communicate the outcomes to the wagering game server for recording or managing a player's account.

In some embodiments, either the client or the wagering game server(s) can provide functionality that is not directly related to game play. For example, account transactions and account rules may be managed centrally (e.g., by the wagering game server(s)) or locally (e.g., by the client). Other functionality not directly related to game play may include power management, presentation of advertising, software or firmware updates, system quality or security checks, etc.

Furthermore, the wagering game system architecture 400 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 5:
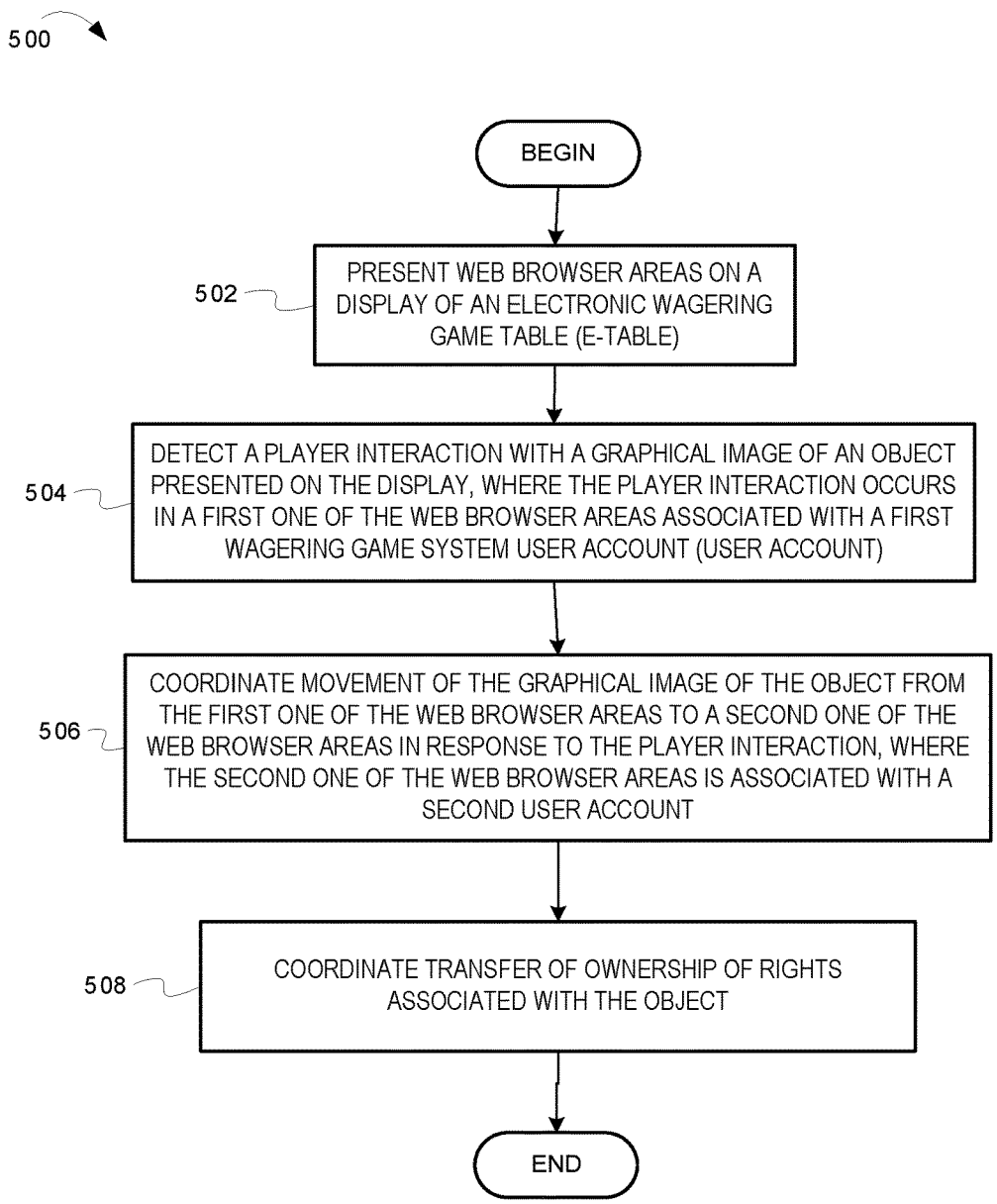
FIG. 5 is a flow diagram 500 illustrating controlling browser areas and objects, according to some embodiments.

FIG. 5 is a flow diagram ("flow") 500 illustrating controlling browser areas and objects, according to some embodiments. In FIG. 5, the flow 500 begins at processing block 502, where a wagering game system ("system") presents web browser areas on a display of an electronic wagering game table (e-table). Web browser areas are examples of graphical player interface areas that present the objects. The graphical player interfaces areas are presented using instances of web browsers.

The flow 500 continues at processing block 504, where the system detects a player interaction with a graphical image of an object presented on the display, where the player interaction occurs in a first one of the web browser areas associated with a first wagering game system user account (user account). The player interaction with the graphical image can be a gesturing motion, similarly as described in FIG. 1. In some embodiments, the gesturing can include a gesturing motion that includes a series of actions that select a graphical image of an object and indicate one or more physics elements (e.g., vector elements) that indicate a direction, a force, a destination, etc. for a trajectory (e.g., a vector, arc, path, etc.) that the graphical image of the object will travel across a display without the user having to maintain a constant contact with the graphical image of the object.

For example, the system can detect a first player gesturing action via player input that indicates a user's selection of a graphical image for an object (an "object selection action"). The object selection action, for example, may include tactile, or touching, placement or pressing (e.g., placing a finger, a pen, a wand, or other selection mechanism on a graphical image of an object). The object selection action, in another example, may include a tactile lasso motion (e.g., drawing a lasso around a graphical image of an object). In yet another example, the object selection action may include a pinching motion (e.g., closing a finger and thumb on a graphical image of an object,).

The system can detect a second player gesturing action via player input that indicates a user's desired degree of force to be applied to the graphical image of the object (an "object forcefulness action" or "object thrust action"). For example, the system may detect a speed of motion for a player's finger, hand, wrist, etc., that indicates a degree of force to apply to the simulated physics of the object. For instance, the system can detect how quickly a user moves his or her finger, hand, wrist, etc. and the system can convert the quickness, or speed, of the player's movement into a relative force factor to apply to a mass characteristic for the object, thus generating a momentum value for the object according to object physics rules. The system can use the object forcefulness action to generate a speed for the object and/or distance for the object to travel according to environment physics rules (e.g., according to density factors, gravitational factors, etc.) of a simulated environment presented on the e-table display.

The system can detect a third player gesturing action via player input that indicates a user's desired direction of movement for the object (e.g., an "object directionality action"). For example, a player may move an object along a short path while the graphical image of the object is within the player's control. For example, a player may drag their finger along a short line, arc, or other path on a display. The line, arc, or other path is a shortened version of a trajectory that the object should follow. The system can use the object directionality action to determine (e.g., estimate, project, etc.) a final destination for the object and to determine a path, or trajectory, for the object to follow. In some embodiments, the system can cause the path to be straight, arced, wavy, random, etc. The system can detect obstacles in the way of the path and cause the object to avoid the obstacles on its journey to the final destination. In some embodiments, the path can comply with environmental physics factors (e.g., a simulated gravitational factor, a simulated air density, etc.).

The system can detect a fourth player action via player input that indicates a point in time or moment that a user desires to release control of the graphical image of the object and start, or initiate, the object's motion on the a path or trajectory toward a final destination (e.g., an "object release action"). For example, the system can detect when a player lifts a finger off a display. In some embodiments, an object release action may be related to (e.g., be a continuation of, be opposite to, be a reversal of, be proportional to, etc.) the object selection action. For example, if the object selection action is to touch the display at the point where the graphical image of the object is at a first position (e.g., at a resting position), then an object release action may be to lift the finger off of the display at a second point on the graphical display after the player has performed an object forcefulness action or object directionality action. In other embodiments, the object release action may be the same as, or a continuation of, the object selection action. For instance, a first tap on a display may indicate a selection, and a second tap may indicate a release. In some embodiments, the system can draw or present a proposed path, a proposed end point, proposed vector (e.g., a partial arrow graphic), etc., related to the player's actions on the e-table display. The system can draw the proposed path, end-point, vector, etc. before the player releases the object so that the player can confirm the path or trajectory or so that the player can confirm a proposed final destination for the object before deciding to release the object.

Some of the gesturing actions can be combined into a composite object motion gesture that indicates one or more of the selection, directionality, forcefulness, and release actions for the object. The composite object motion gesture may include a brief, directional input motion, such as a flick of a wrist or finger that sends an object along a trajectory (e.g., along a path) indicated by the flicking motion. The flick motion can, in one fluid series of actions, (a) indicate the selection of the object (e.g., an initial pressing of a finger onto a display over a graphical image of the object at a beginning of a finger flick), (b) indicate a directionality for the object (e.g., a direction indicated by a drawing of a pattern by a finger flick or a tangent of a rotational arc of a finger flick), (c) indicate a forcefulness for the object (e.g., a speed at which the finger moves in a pattern or rotates along an arc of a finger flick), and (d) indicate a release action for the object (e.g., when a finger flick rotates beyond a domain of the graphical image of the object or when a finger touch or drag is lifted off a display). Other composite motion gestures may include a hold-and-throw, similar to throwing a ball or a dart (e.g., a pinching motion between finger(s) and/or thumb on a graphical image of an object followed by a tossing motion that indicates a direction and/or force, followed by a release of the pinching motion to release the object). Another composite motion gesture may include a point and shoot type of motion, like shooting from a cannon (e.g., touching a thumb on a graphical image of an object to select the object followed by a pointing motion of the pointer finger to indicate a direction, followed by a trigger-pull motion of the middle finger to indicate a release or "shooting" of the object, where the force of the object's motion vector may be indicated by a speed of the trigger-pull).

In some embodiments, the system can detect the gesturing motions and actions using touch screen, cameras, motion sensors, biometric sensors, pressure sensors, etc. In some embodiments, the system can include biometric recognition devices that detect a fingerprint and determine that a specific finger of a user is authorized to perform gesturing motions.

In some embodiments, as described previously, the system can detect accompanying inputs that accompany the gesture, such as a button click or button press while gesturing. The accompanying inputs can indicate that a gesture is in progress, such as, for example, holding down a button at an e-table or holding down a left-mouse button at a computer while performing a gesturing. The system can detect a release of the e-table button to indicate that the gesturing motion is completed and then initiate the objects movement along the trajectory indicated by the gesturing motion while the e-table button was being held down. In some embodiments, the accompanying input indicates a destination for an object. For example, the accompanying input indicates that holding down a second button at the e-table, holding down a key on a computer, or pointing or placing a second finger in a specific direction, indicates that the object is intended for a specific browser area, container object, player station, social contact, player account, etc.

In some embodiments, gesturing can include a drag and drop activity. In some embodiments, the system can detect when a player drags and drops a graphical image of an object an entire distance to an intended direction (e.g., dragging directly to a border of an e-table station adjacent to the player's station at the e-table). However, in other embodiments, the system can detect a drag-and-drop of an object over only a portion of a distance on a trajectory. The system can also detect a drag-and-drop onto a graphical image of a device that can launch an object on a trajectory, such as if dropped onto a graphical image of a cannon, a vehicle, or other similar delivery object on the browser that indicates that the object is to be delivered across browser areas. When a player drags and drops an object onto the delivery object, the player can include a gesture and/or gesture input to indicate a final destination. The delivery object will then send the object across browser areas, or within a single browser area.

In some embodiments, the system can detect a gesture from an inventory (e.g., flick an object from an inventory to another user). The system can detect a finger placement on the inventory and the system can present an interface of many items in the inventory. The player can drag a graphical image of an object from the inventory and gesture (e.g., flick) the item across a display of an electronic wagering game table. In some embodiments, the system can generate an object based on a player's gesturing. For example, if a player places a finger on credit meter, the system can generate a graphical image of a coin from the credit meter to represent an object that the player can send across a display on an electronic table. In some embodiments, the system can detect a selection of an object that is already on a display, such as a slot reel. The system can prompt the user to specify a specific use for the object. For example, if a player wins a slot game, the player may want to send a replay of the win to a friend sitting at the electronic wagering game table. Thus, the system can detect that the player selects (e.g., draws a lasso around) the slot reels, and the system prompts the user to explain what the selection means (e.g., present a dropdown menu or list from which the user can select to generate a video replay object). In other embodiments, the player can specify a setting that indicates what a specific selection action means (e.g., a player setting that indicates that a lasso finger motion around a slot reel means to generate a video replay object). The player can then send a graphical image of the video replay object across the e-table display using a gesturing action.

The flow 500 continues at processing block 506, where the system coordinates movement of the graphical image of the object from the first one of the web browser areas to a second one of the web browser areas in response to the player interaction, where the second one of the web browser areas is associated with a second user account. For instance, browsers may have transparent boundaries between the first web browser and the second web browser, as similarly described in FIG. 1. The system can present movement of the graphical image seamlessly over the transparent boundary along the trajectory. In other words, the system causes the graphical image of the object to appear to move in a fluid motion between transitions between browser areas. The system can calculate and control object physics along a trajectory and control the object across the various browser areas. In some embodiments, the system can transfer control of the graphical image of the object from one web browser to another web browser when the graphical image crosses over the transparent boundary.

The flow 500 continues at processing block 508, where the system coordinates transfer of ownership of rights associated with the object, such as from the first one of the web browser areas to the second one of the browser areas mentioned at processing block 506. In some embodiments, the system can track ownership of objects moved between graphical player interface areas such as web browser areas, by players that control the areas. For instance, as an object (e.g., a coin or avatar accessory) is moved from a first web browser area to a second web browser area, ownership data (e.g., data associated with the object, data tracked by a browser area controller, data controlled by a process, etc.) reflects that the object is no longer owned by a first owner (e.g., a first web browser area, a first object, a first player, etc) and is now owned by a second owner (e.g., a second browser area, a second player, a second object, etc.). The ownership data can be used to modify the object's identity, appearance, characteristics, properties, etc. when ownership passes from one owner to another. If, for example, the object represents money or credits, then ownership data can be used to update a player account (e.g., update an account balance) when ownership of the object moves to a web browser area controlled by the player account. If, for example, the object represents an avatar accessory, then the object can be automatically updated in accordance with a player account or profile of the owning player (e.g., update the avatar to a favorite color indicated in the player account when ownership of the avatar object passes to the player account). In some embodiments, a centralized structure (e.g., a server, a processor, a browser area controller, etc.) tracks ownership of the object as it moves around an e-table. In other embodiments, a data structure (e.g., a field) associated with the object reflects the web browser area (or player) that owns the object. A process or processes can be responsible for updating the central structure and/or the data structure corresponding to the object. The process or processes can be aware of location of objects and web browser boundaries. The process or processes can track, transfer, and modify ownership data.

In some embodiments, ownership can extend to multiple owners (e.g., to multiple browser areas, to multiple objects, to multiple players, etc.) over time depending on a configuration of browsers, a number of players interacting with an object, an intended path of an object, etc. For example, some browsers can overlap. Thus, an object may be in an area that has multiple overlapped browser areas, but the ownership of the object may be assigned to any or, or more of the browsers areas, or to none of the browser areas. For instance, if an object is passing through a browser area and does not intend to stop within the browser area, the system does not have to pass any control of the object to the browser area. Rather, the system can maintain ownership with an original sender of the object until the object comes to rest, stops moving, is interacted with, etc. In some embodiments, the system can detect which of the overlapping browser areas is in a highest layer of a stack of layered browsers (e.g., above other layers), similar to how a window that overlaps another window indicates activity and priority for commands, data, etc. The system can also refer to user significance (e.g., players that have higher player status, players that are winning, player's that possess a greater portion of one of the overlapped browser areas, etc.) and use the user significance to control ownership of the object in overlapped browser areas.

In some embodiments, the system can decide to assign, modify, or maintain ownership rights based on various activities, events, times, etc. such as when a tactile input ceases (e.g., lifting a finger off the object), when an object begins a trajectory, when an object combines with another object, when an object is touched, when an object is used, etc.

In some embodiments, if an object is in or on a location of a shared display that reflects uncertainty of an owner (e.g., the object comes to rest on a boundary of one or more browsers), the system can refer to a set of ownership control rules that control how the ownership should be controlled. For example, if an object comes to rest on a boundary, the ownership control rules may indicate that the browser area that encountered the object last becomes the owner (e.g., if an object moves even slightly into a second browser area from a first browser area, the system determines that the second browser area may receive ownership of the object). In other embodiments, the rules may indicate that whichever browser area possesses the most surface area, mass, or other characteristic of an object, becomes the owner.

The system can also manage ownership by integrating with wagering game programming, rules, etc. For instance, the system can integrate with game rules for a given wagering game that is loaded, and/or being played by players at an e-table. The system can dynamically adapt to game rules as different games are loaded, unloaded, highlighted, swapped, etc. at an e-table.

The system can utilize object identifiers to track the objects and pass control from one controlling structure to another. The system can also utilize encrypted data, signatures, hashes, fingerprints, etc. with certain types of objects, such as objects that relate to money. Thus, if a coin object comes to rest in a browser area that was unintended or that is unauthorized, the objects within that area may be restricted from interacting with, or obtaining control of that object, unless the objects can provide authentication (e.g., can unlock a secret with a key).

One example of tracking ownership associated with an object includes the transfer of money via a financial transaction when a money object passes from a first browser area, controlled by a first player account, to a second browser area controlled by a second player account. Gaming systems involve tracking money, usually in the form of financial credits, which the player loads or adds to the player's balance in a player account. Other players also have financial accounts. When the system transfers a money object that has a money value assigned to it, the system can assign both secure financial object data and physical control data to the money object. The financial ownership of the money object may remain with a first player account, which is indicated in the secure financial object data as the owner of the money object. The system, however, can transfer ownership of the physical control data for the object from one browser area, player, object, etc. on the shared display until the money object comes to a final resting place. Once the object comes to a rightful, or intended final resting place, the system can transfer financial ownership of the object, thus unlocking the secure financial object data and transferring ownership of the money value from one player account to another. The system thus performs financial transactions concurrently with presenting movement and/or termination of movement of graphical objects across browser areas. In some embodiments, a casino may also have an account. The system can transfer money rights to the casino via the casino's user account. For example, a player can flick money to a game or bet control, which indicates an opt-in, or bet on a wagering game. For example, the system can detect a bet on a primary wagering game or a secondary wagering game by flicking a graphical image of a money object (e.g. a coin, a dollar, a gold nugget, etc.) to a betting area for the primary game or in a secondary game on an e-table. In some embodiments, the system can also detect side-bets on another player's game. For example, a first player may want to side-bet on a second player's spinning of slot reels at an e-table. The first player can flick a graphical image of a money object to the second player's player station before the second player initiates a spin of the reels. The system can then transact a financial transaction for the first player as a side-bet and for the second player as a primary bet on the reel spin. In some embodiments, the system can provide an option for a player to flick items onto adjacent e-tables. In other embodiments, the system can provide games at which e-tables compete or collaborate with each other using item gesturing. For example, the system can present a container object, or pot, at an e-table and players can flick graphical images of game play items (e.g., beads, chips, coins, etc.) into the pot. In some embodiments, the objects that the players can flick into the pot may be money objects. In some embodiments, the system can track an amount of money that a player contributes to a pot. They system can further divide rewards based on proportional contributions to the pot. As part of a competitive game, as the pot amount increases, the system can change the pot's characteristics (e.g., color, size, etc.) indicating that a big event is about to occur and to encourage additional contributions to the pot.

As described previously, a player can use the system to flick money to a graphical representation of a waiting staff's money container. For example, the system can detect when a server places a staff card/identifier on a table. The system causes a tip-jar application to launch, which presents a graphical image of a tip jar on an e-table display. Players can tip by gesturing money into a graphical image of the tip jar. The system can also detect payment for drinks or other orders in a similar fashion, by flicking graphical images of money objects at a waiting staff's money container. In some embodiments, the waiting staff can flick change back or the system can provide back automated change amounts.

In some embodiments, the system can transfer control of objects in community game play or exchange objects. For instance, in a community game coins may splash or erupt onto a screen as part of a bonus. A player can flick items to other player browser areas (e.g., flick a coin to a friend before performing a touch, or other activity, that indicates that the player selected the coin for himself or herself). In some embodiments, players can use the system to trade cards by flicking graphical images of playing cards (e.g., flicking cards that are face down or that have not been looked at yet). In some embodiments, the system can present a game where a token has a negative effect, like a "hot potato" game, and players can flick the token away from them to other players.

In another example, the system can transfer ownership of avatar objects, such as a game where a player can change dragon characteristics of a dragon avatar (e.g., can change hat, breath, clothes, etc.). A player may possess a specific item for the dragon avatar, such as a dragon hat, and may want to give the dragon hat to another player. The player can gesture (e.g., flick or drag) a hat onto an area of an e-table display, or on a webpage, that relates to the other player. The other player can receive a notification of the gift and the system transfers the dragon hat to the other player's inventory In some embodiments, the system can honor a player's settings to ignore or shield a player from some or all types of object movement across browser areas. For example, the system can detect a player setting that ignores gesturing. The player, for example, can draw, or activate, a shield or barrier across one or more browser areas assigned to the player. The system can cause objects to bounce of off shields or barriers, similar to in FIG. 1. In some embodiments, the system can modify a shield or barrier to redirect, or modify, a trajectory of an object to a desired location of the player that activated the barrier. In some embodiments, the system can modify a shield or barrier over time or with a player status or history (e.g., boundary becomes more porous, magnetic, or gravitational, the more that a player plays).

Figure 6:
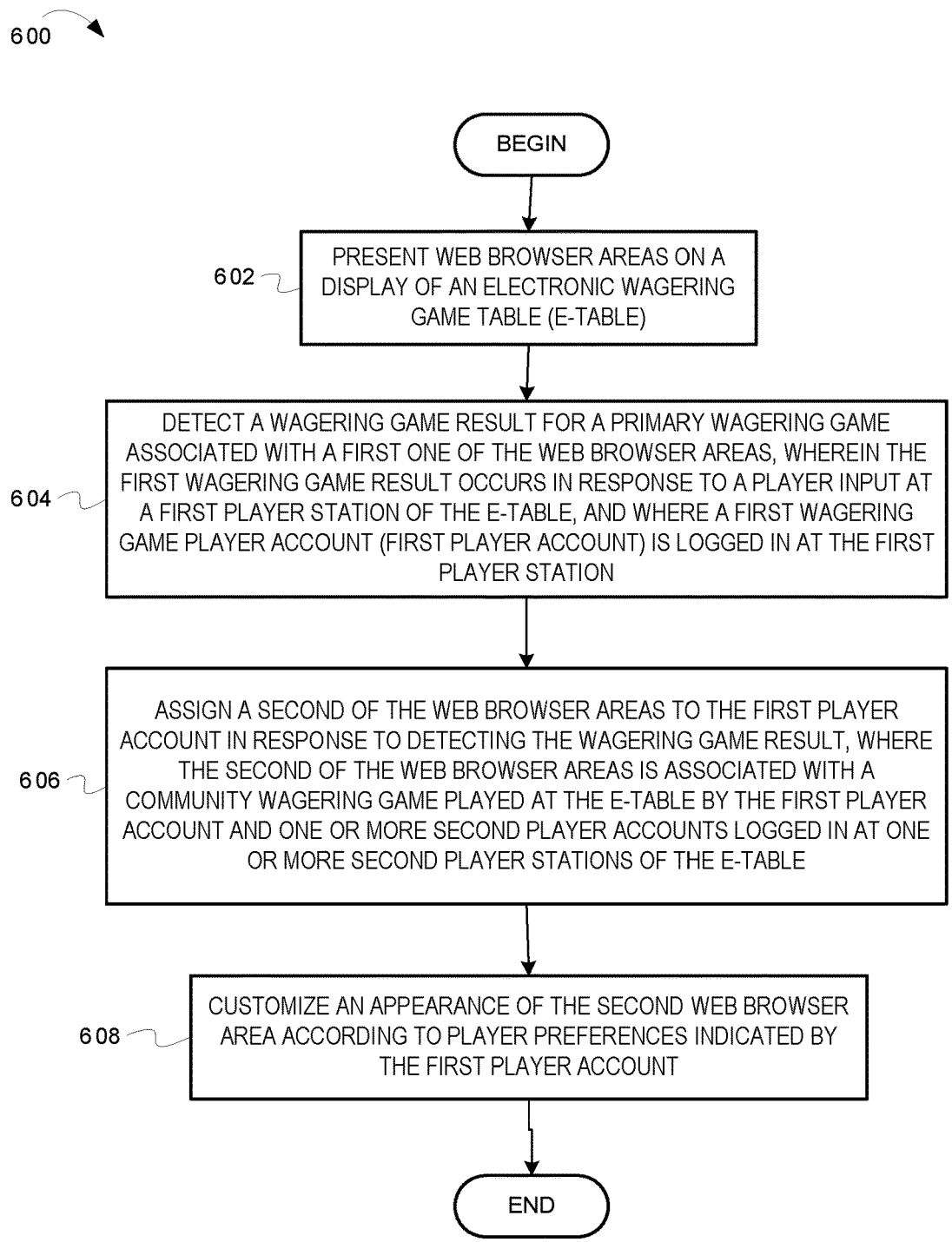
FIG. 6 is a flow diagram 600 illustrating controlling and customizing web browser areas for wagering games, according to some embodiments.

FIG. 6 is a flow diagram ("flow") 600 illustrating controlling and customizing web browser areas for wagering games, according to some embodiments. In FIG. 6, the flow 600 begins at processing block 602, where a wagering game system ("system") presents web browser areas on a display of an electronic wagering game table (e-table).

The flow 600 continues at processing block 604, where the system detects a wagering game result for a primary wagering game associated with a first one of the web browser areas, wherein the first wagering game result occurs in response to a player input at a first player station of the e-table, and where a first wagering game player account (first player account) is logged in at the first player station. For example, in FIG. 1, a player at player station 101 plays the primary wagering game 109. The player may win a game, spend a specific amount of money, receive a specific prize, or perform or experience any game type of event associated with the primary wagering game 109.

The flow 600 continues at processing block 606, where the system assigns a second of the web browser areas to the first player account in response to detecting the wagering game result, where the second of the web browser areas is associated with a community wagering game played at the e-table by the first player account and one or more second player accounts logged in at one or more second player stations of the e-table. For example, as shown in FIG. 1, the system 100 awarded a player the customized graphical image of a game zone 174 in a territory-based community game. In other embodiments, one player account can have control over multiple browser areas, or multiple accounts can have domain over one browser area.

The flow 600 continues at processing block 608, where the system customizes an appearance of the second web browser area according to player preferences indicated by the first player account. For example, in FIG. 1, the system 100 modified the customized graphical image of a game zone 174 to be a player's custom selected pattern, color, or other characteristic. In some embodiments, the system 100 can cause the customized graphical image of the game zone 174 to expand. In some embodiments, the system 100 can award canons, or other shooting devices, that players can use in a mock battle. As a player wins a battle, the system 100 can award, or change, game zones to match a player's customized identifiers to indicate the player's domain of the game zones. When a map of all game zones for the battle is filled up, the system 100 can award a progressive award to the player with the most customized game zones (i.e., with the most customized space across browser areas). The system 100 can provide ways for players to customize game zones. For example, the system 100 provides controls for a player to assign geographic names or images to game zones (e.g., a player selects a United States flag as a symbol to appear on all the player's game zones, a player select mountainous terrain or textures to represent their game zones, etc.). In another example, the system 100 provides controls for a player to specify and assign custom graphics to a game zone (e.g., a player selects a smiley face to customize a game zone, a player specifies a sports logo to skin a game zone, etc.). In some embodiments, the system can skin an entire table with a sports team's logo, a NAS-CAR driver's team branding, etc. The system 100 can track common goals for a table, which common goal may unlock content at the table, such as unlocking new skins, new game zones, new capabilities to customize browser areas and objects, etc. In some embodiments, the system 100 can also provide customization options for players to merge game zones or combine object collections (e.g., combine a coin pot or wallet with other players, share or combine a group of game play elements such as a common spin button, etc.).

Additional Example Operating Environments

This section describes example operating environments, systems and networks, and presents structural aspects of some embodiments.

Wagering Game Computer System

Figure 7:
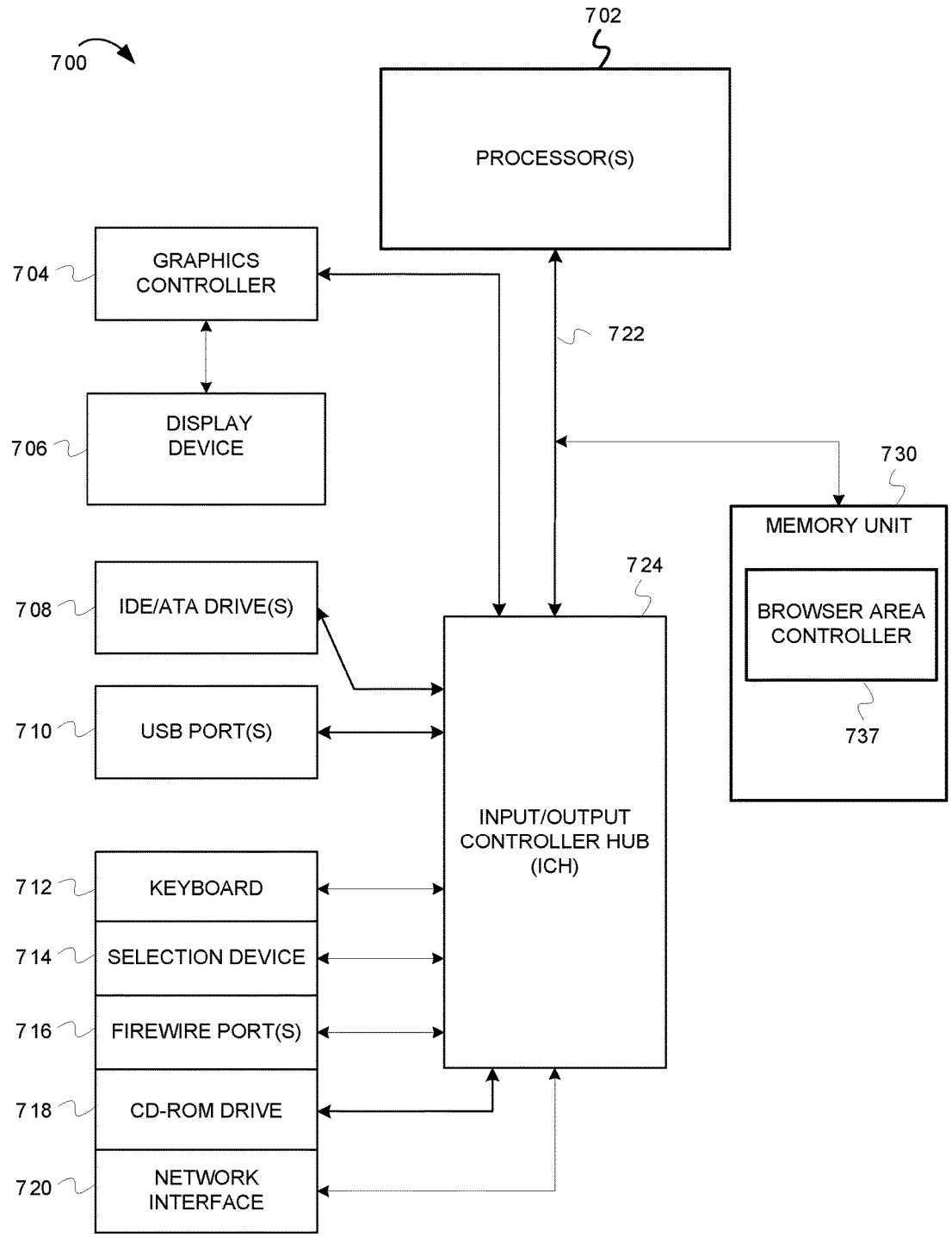
FIG. 7 is an illustration of a wagering game computer system 700, according to some embodiments.

FIG. 7 is a conceptual diagram that illustrates an example of a wagering game computer system 700, according to some embodiments. In FIG. 7, the wagering game computer system ("computer system") 700 may include a processor unit 702, a memory unit 730, a processor bus 722, and an Input/Output controller hub (ICH) 724. The processor unit 702, memory unit 730, and ICH 724 may be coupled to the processor bus 722. The processor unit 702 may comprise any suitable processor architecture. The computer system 700 may comprise one, two, three, or more processors, any of which may execute a set of instructions in accordance with some embodiments.

The memory unit 730 may also include an I/O scheduling policy unit and I/O schedulers. The memory unit 730 can store data and/or instructions, and may comprise any suitable memory, such as a dynamic random access memory (DRAM), for example. The computer system 700 may also include one or more suitable integrated drive electronics (IDE) drive(s) 708 and/or other suitable storage devices. A graphics controller 704 controls the display of information on a display device 706, according to some embodiments.

The input/output controller hub (ICH) 724 provides an interface to I/O devices or peripheral components for the computer system 700. The ICH 724 may comprise any suitable interface controller to provide for any suitable communication link to the processor unit 702, memory unit 730 and/or to any suitable device or component in communication with the ICH 724. The ICH 724 can provide suitable arbitration and buffering for each interface.

For one embodiment, the ICH 724 provides an interface to the one or more IDE drives 708, such as a hard disk drive (HDD) or compact disc read only memory (CD ROM) drive, or to suitable universal serial bus (USB) devices through one or more USB ports 710. For one embodiment, the ICH 724 also provides an interface to a keyboard 712, selection device 714 (e.g., a mouse, trackball, touchpad, etc.), CD-ROM drive 718, and one or more suitable devices through one or more firewire ports 716. For one embodiment, the ICH 724 also provides a network interface 720 though which the computer system 700 can communicate with other computers and/or devices.

The computer system 700 may also include a machine-readable storage medium that stores a set of instructions (e.g., software) embodying any one, or all, of the methodologies for control wagering game system browser areas. Furthermore, software can reside, completely or at least partially, within the memory unit 730 and/or within the processor unit 702. The computer system 700 can also include a browser area controller 737. The browser area controller 737 can process communications, commands, or other information, to control wagering game system browser areas. Any component of the computer system 700 can be implemented as hardware, firmware, and/or machine-readable storage media including instructions for performing the operations described herein.

Personal Wagering Game System

Figure 8:
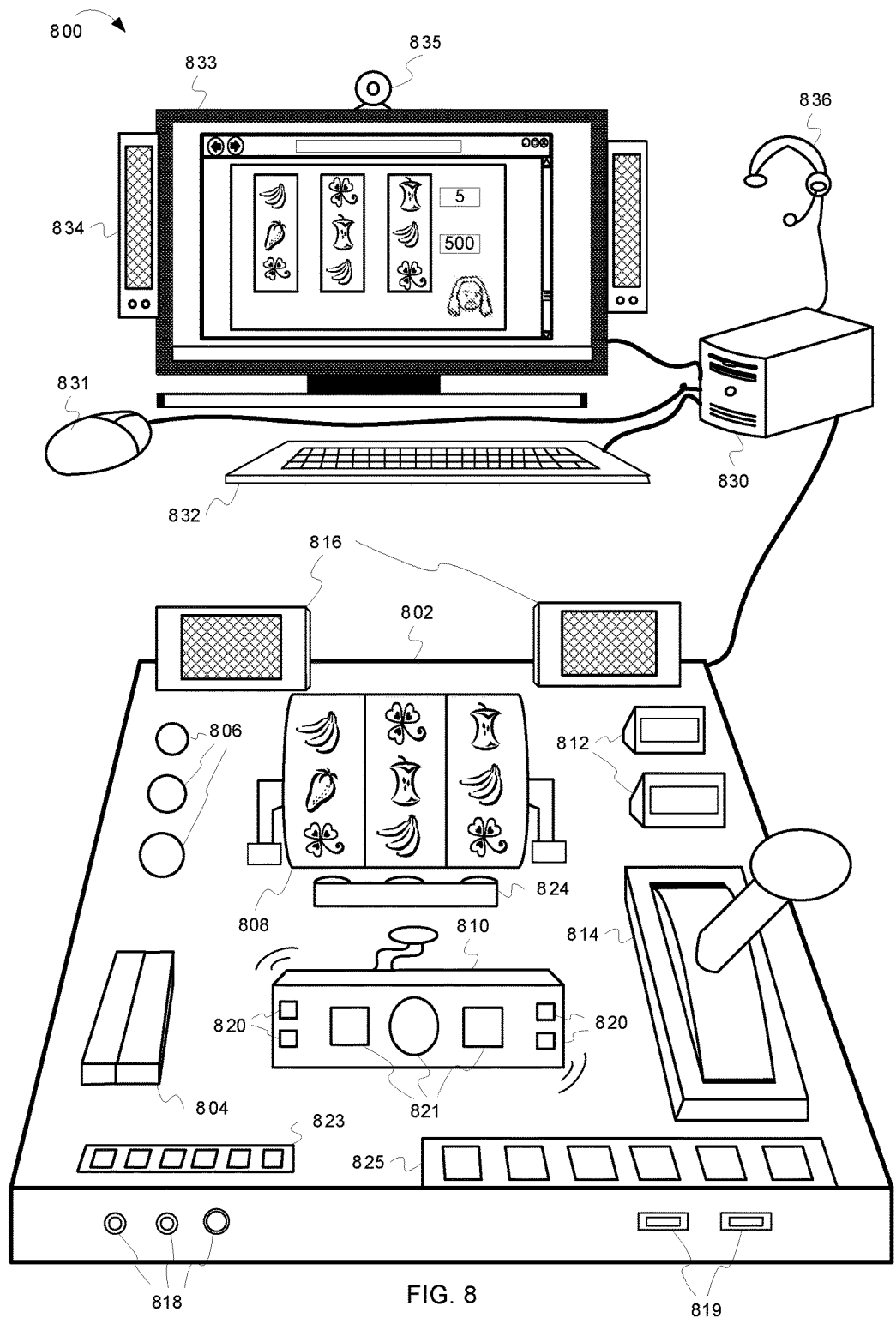
FIG. 8 is an illustration of a personal wagering game system 800, according to some embodiments.

FIG. 8 is a conceptual diagram that illustrates an example of a personal wagering game system 800, according to some embodiments. In FIG. 8, the personal wagering game system ("system") 800 includes an exemplary computer system 830 connected to several devices, including user input devices (e.g., a keyboard 832, a mouse 831), a web-cam 835, a monitor 833, speakers 834, and a headset 836 that includes a microphone and a listening device. In some embodiments, the webcam 835 can detect fine details of a person's facial features, from an eye-level perspective. The web-cam 835 can use the fine detail to determine a person's identity, their demeanor, their facial expressions, their mood, their activities, their eye focus, etc. The headset 836 can include biometric sensors configured to detect voice patterns, spoken languages, spoken commands, etc. The biometric sensors in the web-cam 835 can detect colors (e.g., skin colors, eye colors, hair colors, clothing colors, etc.) and textures (e.g., clothing material, scars, etc.). The biometric sensors in the web-cam 835 can also measure distances between facial features (e.g., distance between eyes, distance from eyes to nose, distance from nose to lips, length of lips, etc.). The system 800 can generate a facial and body map using the detected colors, textures, and facial measurements. The system 800 can use the facial and body map to generate similar facial features and body appearances for a player account avatar. Also connected to the computer system 830 is a gaming control device ("gaming pad") 802 including wagering game accoutrements associated with wagering games. The wagering game accoutrements include one or more of prop reels 808, prop game meters 812, indicators 806, a game control device 810, a physical lever 814, a magnetic card reader 804, a video projection device 824, input/output ports 818, USB ports 819, and speakers 816. The gaming pad 802 can present feedback of online activities. For instance, the gaming pad 802 can use vibrations and signals on the gaming control device (e.g., the game control device 810 or the physical lever 814 can vibrate to indicate a back pat from another player or a game celebration, the indicators 806 can blink, etc.). The physical lever 814 can produce feelings in the lever to emulate a pulling feel or a vibration. The video projection device 824 can project video onto the prop reels 808 so that the prop reels 808 can present many different types of wagering games. The prop reels 808 can spin when the physical lever 814 is pulled. The video projection device 824 can project reel icons onto the prop reels 808 as they spin. The video projection device 824 can also project reel icons onto the prop reels 808 when the prop reels 808 are stationary, but the imagery from the video project device 824 makes the prop reels 808 appear to spin. The magnetic card reader 804 can be used to swipe a credit card, a player card, or other cards, so that the system can quickly get information. The system 800 can offer lower rates for using the magnetic card reader 804 (e.g., to get a lower rate per transaction). The game control device 810 can include an emotion indicator keypad with keys 820 that a player can use to indicate emotions. The game control device 810 can also include biometric devices 821 such as a heart-rate monitor, an eye pupil dilation detector, a fingerprint scanner, a retinal scanner, voice detectors, speech recognition microphones, motion sensors, sound detectors, etc. The biometric devices 821 can be located in other places, such as in the headset 836, within a chair (not shown), within personal control devices (e.g. joysticks, remote controls, game pads, roller-balls, touch-pads, touch-screens, etc.), within the web-cam 835, or any other external device. The external devices can be connected to the computer 830 or to the game control device 810 via the input/output ports 818. As a security feature, some biometric devices can be associated with some of the gaming pad devices (e.g., the magnetic card reader 804), such as a fingerprint scanner, a retinal scanner, a signature pad to recognize a player's signature, etc. The game control device 810 can also use the keys 820 to share items and control avatars, icons, game activity, movement, etc. within a network wagering venue. The game pad can also have an electronic (e.g., digital) button panel 825, an electronic control panel 823, or any other type of changeable panel that can change appearance and/or configuration based on the game being played, the action being performed, and/or other activity presented within an online gaming venue. The game control device 810 can also move in different directions to control activity within the online gaming venue (e.g., movement of a player's avatar moves in response to the movements of the game control device 810). Avatars can be pre-programmed to act and look in certain ways, which the player can control using the system 800. The gaming pad 802 can permit the player to move the avatar fluidly and more easily than is possible using a standard keyboard. The system 800 can cause an avatar to respond to input that a player receives via the gaming pad 802. For example, a player may hear a sound that comes primarily from one direction (e.g., via stereophonic signals in the headset 836) within the network wagering venue. The system 800 can detect the movement of the player (e.g., the system 800 detects that a player moves his head to look in the direction of the sound, the player uses the game control device 810 to move the avatar's perspective to the direction of the sound, etc.). The system 800 can consequently move the avatar's head and/or the avatar's perspective in response to the player's movement. The player can indicate an expression of an emotion indicated by the player using the keys 820. The system 800 can make the avatar's appearance change to reflect the indicated emotion. The system 800 can respond to other movements or actions by the player and fluidly move the avatar to respond. The system 800 can also interpret data provided by the biometric devices and determine expressions and/or indications of emotions for a player using the system 800.

Wagering Game Machine Architecture

Figure 9:
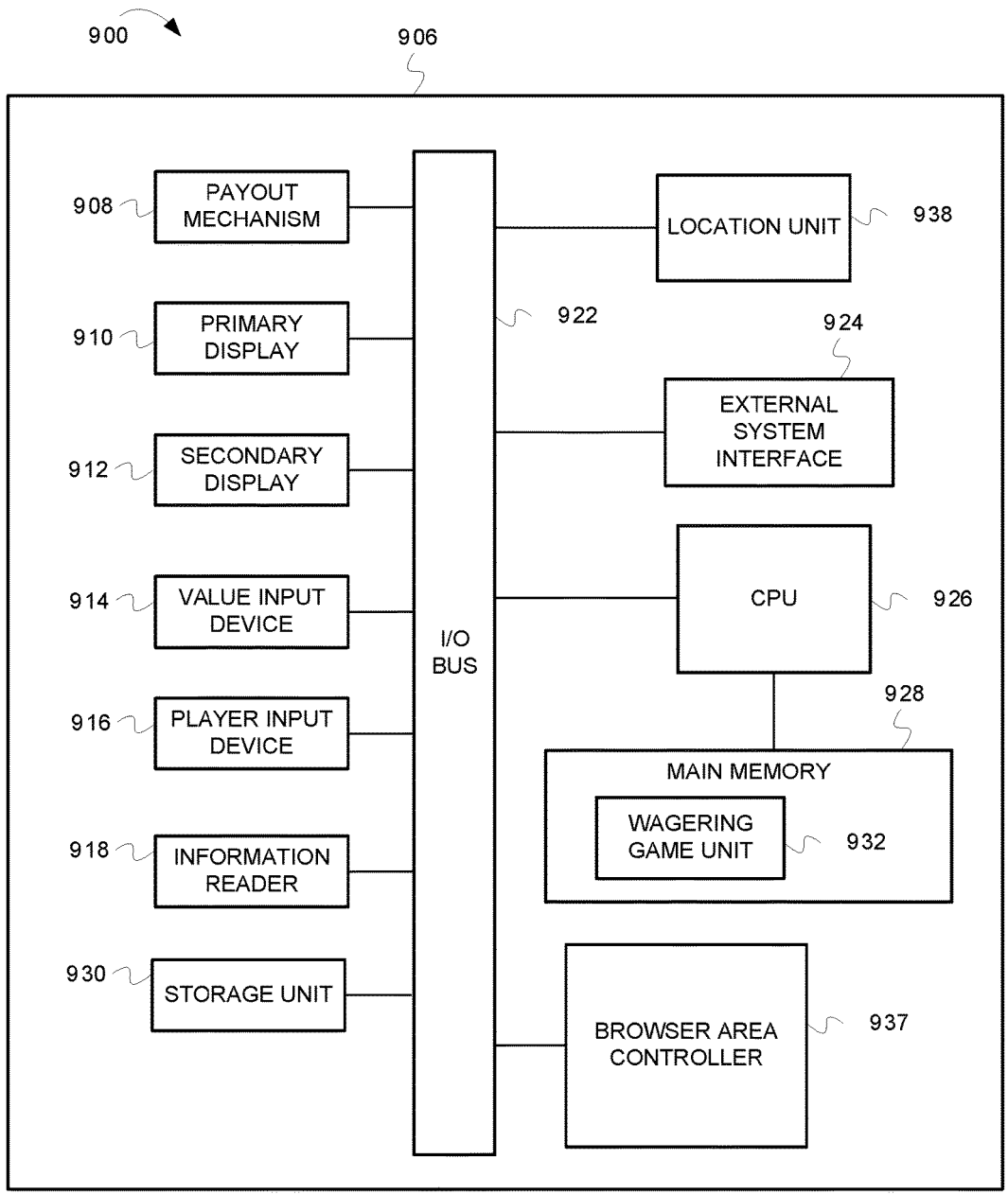
FIG. 9 is an illustration of a wagering game machine architecture 900, according to some embodiments.

FIG. 9 is a conceptual diagram that illustrates an example of a wagering game machine architecture 900, according to some embodiments. In FIG. 9, the wagering game machine architecture 900 includes a wagering game machine 906, which includes a central processing unit (CPU) 926 connected to main memory 928. The CPU 926 can include any suitable processor, such as an Intel® Pentium processor, Intel® Core 2 Duo processor, AMD Opteron™ processor, or UltraSPARC processor. The main memory 928 includes a wagering game unit 932. In some embodiments, the wagering game unit 932 can present wagering games, such as video poker, video blackjack, video slots, video lottery, reel slots, etc., in whole or part.

The CPU 926 is also connected to an input/output ("I/O") bus 922, which can include any suitable bus technologies, such as an AGTL+ frontside bus and a PCI backside bus. The I/O bus 922 is connected to a payout mechanism 908, primary display 910, secondary display 912, value input device 914, player input device 916, information reader 918, and storage unit 930. The player input device 916 can include the value input device 914 to the extent the player input device 916 is used to place wagers. The I/O bus 922 is also connected to an external system interface 924, which is connected to external systems (e.g., wagering game networks). The external system interface 924 can include logic for exchanging information over wired and wireless networks (e.g., 802.11g transceiver, Bluetooth transceiver, Ethernet transceiver, etc.)

The I/O bus 922 is also connected to a location unit 938. The location unit 938 can create player information that indicates the wagering game machine's location/movements in a casino. In some embodiments, the location unit 938 includes a global positioning system (GPS) receiver that can determine the wagering game machine's location using GPS satellites. In other embodiments, the location unit 938 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 9, in some embodiments, the location unit 938 is not connected to the I/O bus 922.

In some embodiments, the wagering game machine 906 can include additional peripheral devices and/or more than one of each component shown in FIG. 9. For example, in some embodiments, the wagering game machine 906 can include multiple external system interfaces 924 and/or multiple CPUs 926. In some embodiments, any of the components can be integrated or subdivided.

In some embodiments, the wagering game machine 906 includes a browser area controller 937. The browser area controller 937 can process communications, commands, or other information, where the processing can control wagering game system browser areas.

Furthermore, any component of the wagering game machine 906 can include hardware, firmware, and/or machine-readable storage media including instructions for performing the operations described herein.

Wagering Game Machine

Figure 10:
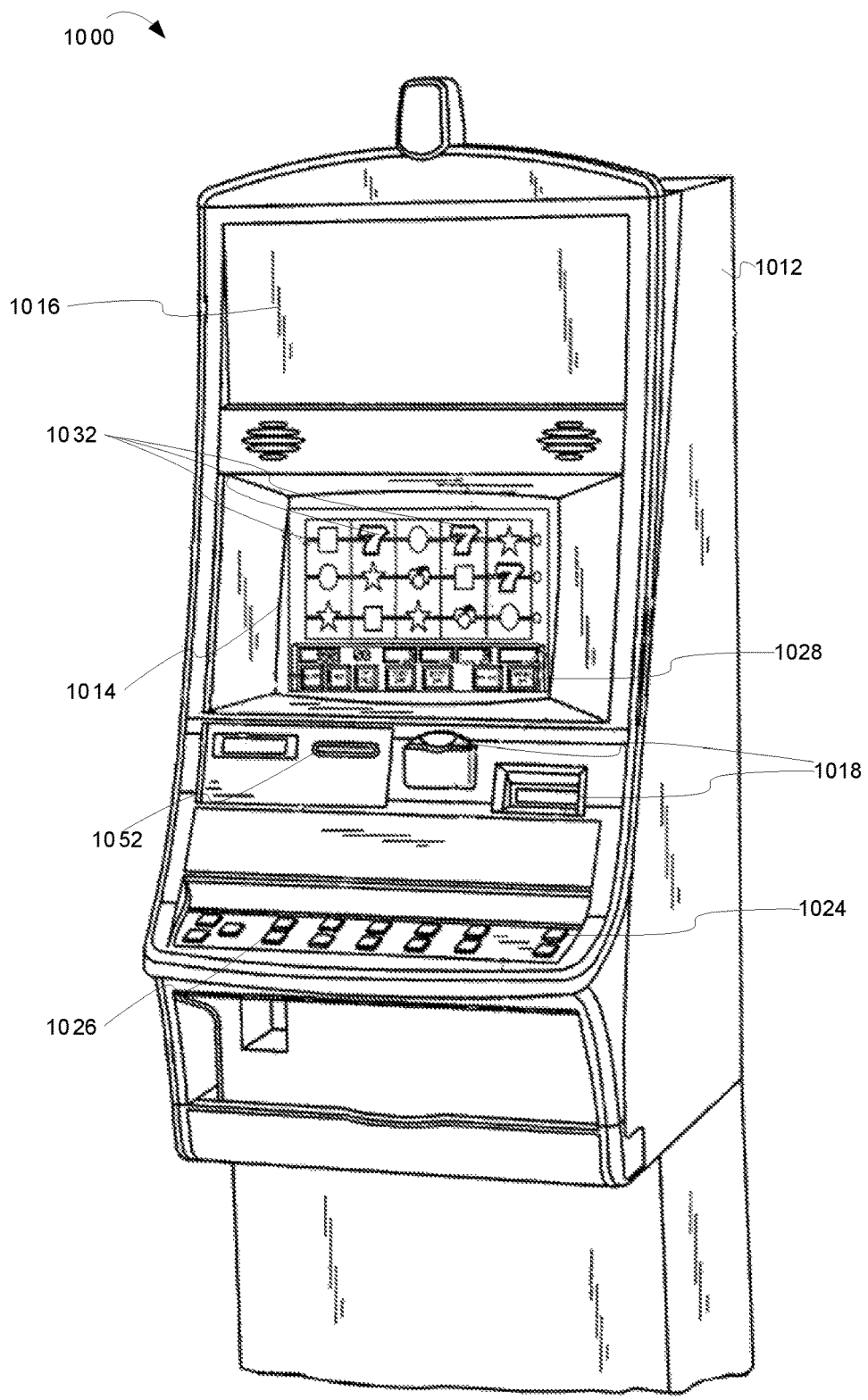
FIG. 10 is an illustration of a wagering game machine 1000, according to some embodiments.

FIG. 10 is a conceptual diagram that illustrates an example of a wagering game machine 1000, according to some embodiments. Referring to FIG. 10, the wagering game machine 1000 can be used in gaming establishments, such as casinos. According to some embodiments, the wagering game machine 1000 can be any type of wagering game machine and can have varying structures and methods of operation. For example, the wagering game machine 1000 can be an electromechanical wagering game machine configured to play mechanical slots, or it can be an electronic wagering game machine configured to play video casino games, such as blackjack, slots, keno, poker, blackjack, roulette, etc.

The wagering game machine 1000 comprises a housing 1012 and includes input devices, including value input devices 1018 and a player input device 1024. For output, the wagering game machine 1000 includes a primary display 1014 for displaying information about a basic wagering game. The primary display 1014 can also display information about a bonus wagering game and a progressive wagering game. The wagering game machine 1000 also includes a secondary display 1016 for displaying wagering game events, wagering game outcomes, and/or signage information. While some components of the wagering game machine 1000 are described herein, numerous other elements can exist and can be used in any number or combination to create varying forms of the wagering game machine 1000.

The value input devices 1018 can take any suitable form and can be located on the front of the housing 1012. The value input devices 1018 can receive currency and/or credits inserted by a player. The value input devices 1018 can include coin acceptors for receiving coin currency and bill acceptors for receiving paper currency. Furthermore, the value input devices 1018 can include ticket readers or barcode scanners for reading information stored on vouchers, cards, or other tangible portable storage devices. The vouchers or cards can authorize access to central accounts, which can transfer money to the wagering game machine 1000.

The player input device 1024 comprises a plurality of push buttons on a button panel 1026 for operating the wagering game machine 1000. In addition, or alternatively, the player input device 1024 can comprise a touch screen 1028 mounted over the primary display 1014 and/or secondary display 1016.

The various components of the wagering game machine 1000 can be connected directly to, or contained within, the housing 1012. Alternatively, some of the wagering game machine's components can be located outside of the housing 1012, while being communicatively coupled with the wagering game machine 1000 using any suitable wired or wireless communication technology.

The operation of the basic wagering game can be displayed to the player on the primary display 1014. The primary display 1014 can also display a bonus game associated with the basic wagering game. The primary display 1014 can include a cathode ray tube (CRT), a high resolution liquid crystal display (LCD), a plasma display, light emitting diodes (LEDs), or any other type of display suitable for use in the wagering game machine 1000. Alternatively, the primary display 1014 can include a number of mechanical reels to display the outcome. In FIG. 10, the wagering game machine 1000 is an "upright" version in which the primary display 1014 is oriented vertically relative to the player. Alternatively, the wagering game machine can be a "slant-top" version in which the primary display 1014 is slanted at about a thirty-degree angle toward the player of the wagering game machine 1000. In yet another embodiment, the wagering game machine 1000 can exhibit any suitable form factor, such as a free standing model, bar top model, mobile handheld model, or workstation console model.

A player begins playing a basic wagering game by making a wager via the value input device 1018. The player can initiate play by using the player input device's buttons or touch screen 1028. The basic game can include arranging a plurality of symbols 1032 along a pay line, which indicates one or more outcomes of the basic game. Such outcomes can be randomly selected in response to player input. At least one of the outcomes, which can include any variation or combination of symbols, can trigger a bonus game.

In some embodiments, the wagering game machine 1000 can also include an information reader 1052, which can include a card reader, ticket reader, bar code scanner, RFID transceiver, or computer readable storage medium interface. In some embodiments, the information reader 1052 can be used to award complimentary services, restore game assets, track player habits, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product, or software, that may include a machine-readable storage medium having stored thereon instructions, which may be used to program a computer system (or other electronic device(s)) to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

What is claimed is:

1. A computer-implemented method for providing a browser on a display device of a wagering game machine, the method comprising:

presenting one or more browsers on the display device;
presenting a browser area in at least a portion of at least one browser of the one or more browsers;
determining an ownership of the browser are;
transferring ownership of an object to a player account associated with the ownership of the browser area in response to the object moving into the browser area; and
customizing the browser area in accordance with the ownership of the browser area.

2. The computer-implemented method of claim 1, further comprising: in response to determining the ownership of the browser area, assigning the browser area to a player account.

3. The computer-implemented method of claim 1, wherein customizing the browser area includes presenting a customized graphical image of a game zone in the browser area.

4. The computer-implemented method of claim 1, wherein customizing the browser area in accordance with the ownership of the browser area is in response to accomplishing a goal in a wagering game presented on the wagering game machine.

5. The computer-implemented method of claim 1, wherein at least one of the one or more browsers is configured to present a community wagering game.

6. The computer-implemented method of claim 1, wherein customizing the browser area in accordance with the ownership of the browser area includes performing at least one member of the group consisting of customizing a color pattern of the browser area, customizing a border of the browser area, customizing shading of the browser area, and presenting a customized graphical image in the browser area.

7. The computer-implemented method of claim 1, wherein customizing the browser area in accordance with the ownership of the browser area is in response to detecting a wagering game event.

8. The computer-implemented method of claim 7, wherein the wagering game event comprises at least one member of the group consisting of a game win, spending a threshold amount of money, and receipt of a prize.

9. The computer-implemented method of claim 1, wherein customizing the browser area in accordance with the ownership of the browser area includes customizing the browser area further in accordance with at least one player preference.

10. A non-transitory computer-readable medium including computer executable instructions which, when executed by one or more processors, cause the one or more processors to:
present one or more browsers on a display device of a wagering game machine;
present a browser area in at least a portion of at least one browser of the one or more browsers;
determine an ownership of the browser area;
transfer ownership of an object to a player account associated with the ownership of the browser area in response to the object moving into the browser area; and
customize the browser area in accordance with the ownership of the browser area.

11. The non-transitory computer-readable medium of claim 10, wherein the computer executable instructions, when executed by the one or more processors, further cause the one or more processors to:
in response to a determination of the ownership of the browser area, assign the browser area to a player account.

12. The non-transitory computer-readable medium of claim 10, wherein the computer executable instructions to customize the browser area include computer executable instructions to present a customized graphical image of a game zone in the browser area.

13. The non-transitory computer-readable medium of claim 10, wherein the computer executable instructions to customize the browser area in accordance with the ownership of the browser area are executed in response to accomplishment of a goal in a wagering game presented on the wagering game machine.

14. The non-transitory computer-readable medium of claim 10, wherein the computer executable instructions to customize the browser area include computer executable instructions to perform at least one member of the group consisting of customize a color pattern of the browser area, customize a border of the browser area, customize shading of the browser area, and present a customized graphical image in the browser area.

15. An apparatus comprising:
one or more processors;
a display device connected to the one or more processors; and
a non-transitory computer-readable medium including computer executable instructions which, when executed by the one or more processors, cause the one or more processors to:
present one or more browsers on the display device, present a browser area in at least a portion of at least one browser of the one or more browsers,
determine an ownership of the browser area,
transfer ownership of an object to a player account associated with the ownership of the browser area in response to the object moving into the browser area, and
customize the browser area in accordance with the ownership of the browser area.

16. The apparatus of claim 15, wherein the computer executable instructions, when executed by the one or more processors, further cause the one or more processors to: in response to a determination of the ownership of the browser area, assign the browser area to a player account.

17. The apparatus of claim 15, wherein the computer executable instructions to customize the browser area include computer executable instructions to present a customized graphical image of a game zone in the browser area.

18. The apparatus of claim 15, wherein the computer executable instructions to customize the browser area include computer executable instructions to perform at least one member of the group consisting of customize a color pattern of the browser area, customize a border of the browser area, customize shading of the browser area, and present a customized graphical image in the browser area.

19. The apparatus of claim 15, wherein the computer executable instructions to customize the browser area include computer executable instructions to are executed in response to detecting a wagering game event.

* * * * *